(12) United States Patent
Gelfenbeyn et al.

(10) Patent No.: US 11,983,638 B2
(45) Date of Patent: May 14, 2024

(54) EXAMPLE-DRIVEN MACHINE LEARNING SCHEME FOR DIALOG SYSTEM ENGINES

(71) Applicant: GOOGLE LLC, Mountain View, CA (US)

(72) Inventors: Ilya Gennadyevich Gelfenbeyn, Sunnyvale, CA (US); Artem Goncharuk, Arlington, VA (US); Pavel Aleksandrovich Sirotin, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 39 days.

(21) Appl. No.: 17/499,616

(22) Filed: Oct. 12, 2021

(65) Prior Publication Data

US 2022/0036015 A1 Feb. 3, 2022

Related U.S. Application Data

(63) Continuation of application No. 15/062,151, filed on Mar. 6, 2016, now abandoned.

(60) Provisional application No. 62/129,759, filed on Mar. 6, 2015.

(51) Int. Cl.
*G06N 5/022* (2023.01)
*G06F 40/30* (2020.01)

(52) U.S. Cl.
CPC ............. *G06N 5/022* (2013.01); *G06F 40/30* (2020.01)

(58) Field of Classification Search
CPC ................................ G06N 5/022; G06F 40/30
See application file for complete search history.

(56) References Cited

U.S. PATENT DOCUMENTS

| | | | |
|---|---|---|---|
| 7,080,004 B2 | 7/2006 | Wang et al. | |
| 9,390,087 B1 | 7/2016 | Roux et al. | |
| 2003/0154077 A1 | 8/2003 | Tahara et al. | |
| 2006/0203980 A1 | 9/2006 | Starkie | |
| 2009/0089045 A1 | 4/2009 | Lenat et al. | |
| 2011/0040552 A1* | 2/2011 | Van Guilder | G06F 40/40 704/4 |
| 2011/0173037 A1* | 7/2011 | Attenberg | G06Q 30/02 705/7.11 |
| 2011/0301955 A1 | 12/2011 | Byrne et al. | |

(Continued)

OTHER PUBLICATIONS

Wikipedia. Drop-down list. Article version from Feb. 1, 2015. https://en.wikipedia.org/w/index.php?title=Drop-down_list&oldid=645226048. Accessed May 19, 2023. (Year: 2015).*

Primary Examiner — Markus A. Vasquez
(74) Attorney, Agent, or Firm — Gray Ice Higdon

(57) ABSTRACT

A method for example-driven machine learning is disclosed herein. The method comprises maintaining a plurality of dialog system rules and a knowledge database including a plurality of intent objects and a plurality of entity objects. The plurality of intent objects and the plurality of entity objects are associated with at least one dialog system rule. An exemplary phrase is received and one or more linguistic elements are retrieved from the exemplary phrase. It is determined that at least one of the linguistic elements is directed to at least one of the plurality of intent objects of the plurality of entity objects and the at least one of the linguistic elements in association with the at least one dialog system rule is added to the knowledge database.

16 Claims, 16 Drawing Sheets

(56) References Cited

U.S. PATENT DOCUMENTS

| | | | |
|---|---|---|---|
| 2011/0307241 A1* | 12/2011 | Waibel | G06F 40/44 |
| | | | 704/2 |
| 2013/0035961 A1 | 2/2013 | Yegnanarayanan | |
| 2013/0268260 A1* | 10/2013 | Lundberg | G06F 11/3664 |
| | | | 704/8 |
| 2014/0379326 A1 | 12/2014 | Sarikaya et al. | |
| 2015/0081290 A1 | 3/2015 | Tremblay et al. | |
| 2015/0100943 A1* | 4/2015 | Gabel | G06F 40/20 |
| | | | 717/106 |
| 2015/0301795 A1* | 10/2015 | Lebrun | G10L 15/18 |
| | | | 704/9 |
| 2016/0179801 A1 | 6/2016 | Venkataraman et al. | |
| 2016/0196820 A1* | 7/2016 | Williams | G10L 15/1822 |
| | | | 704/244 |
| 2016/0260029 A1 | 9/2016 | Gelfenbeyn et al. | |

\* cited by examiner

NewAgent >> Entities >> city

Create Entity city ✎

ⓘ Separate synonyms by pressing enter or ; key

| New York | Big Apple | Enter synonym ... | | — 410 List of synonyms
| Washington | DC | Enter synonym ... |
| Paris | Enter synonym ... | | — 420 Singular reference value/ canonical value for a given entity value
| Enter synonym ... |
| Enter synonym ... |

+ Add a row

Save | Save & Close

New York, NY, USA
Washington, DC, USA
Paris
Enter reference value ...
Enter reference value ...

Cancel

Try it now... ← 400

Please use test console above to try a sentence

FIG. 4 hotelChain

☑ Define synonyms ⓘ ← Define synonyms

☐ Allow automated expansion ← Automatically expand entities based on entity content

ⓘ Separate synonyms by pressing enter or ; key

| Hyatt | Hyatt, Grand Hyatt |
| Marriott | Marriott, The Ritz Carlton |
| IHG | Holiday Inn | Enter Synonym ... |
| | | Click here to edit entry |
| | | Click here to edit entry |

+ Add a row

Save

EXAMPLE-DRIVEN MACHINE LEARNING SCHEME FOR DIALOG SYSTEM ENGINES

BACKGROUND

Conventional dialog systems are widely used in the information technology industry, especially in the form of mobile applications for wireless telephones and tablet computers. Generally, a dialog system refers to a computer-based agent having a human-centric interface for accessing, processing, managing, and delivering information. Dialog systems are also known as chat information systems, spoken dialog systems, conversational agents, chatter robots, chatterbots, chatbots, chat agents, digital personal assistants, automated online assistants, and so forth. All these terms are within the scope of the present disclosure and referred to as a "dialog system" for simplicity.

Traditionally, a dialog system interacts with its users in natural language to simulate an intelligent conversation and provide personalized assistance to the users. For example, a user may generate requests to the dialog system in the form of conversational questions, such as "Where is the nearest hotel?" or "What is the weather like in Alexandria?" and receive corresponding answers from the dialog system in the form of audio and/or displayable messages. The users may also provide voice commands to the dialog system requesting the performance of certain functions including, for example, generating e-mails, making phone calls, searching particular information, acquiring data, navigating, requesting notifications or reminders, and so forth. These and other functionalities make dialog systems popular as they assist users, especially holders of portable electronic devices such as smart phones, cellular phones, tablet computers, gaming consoles, and the like.

Although the demand for dialog systems is constantly growing, creating a dialog system is a challenging task. Each dialog system has a dialog system engine, which is responsible for receiving user voice or text inputs, interpreting them, generating corresponding responses to user inputs, and delivering these responses to the user. Interpreting the inputs and finding proper responses can be complicated and not trivial because dialog systems employ artificial intelligence. Accordingly, many software developers can struggle to develop a well-operating dialog system enabled to handle a wide range of user requests. It can also be expensive for software or engineering companies to create and integrate dialog systems into new software or hardware products. A further difficulty is to create a comprehensive knowledge database for use by a dialog system such that it can accurately interpret various dialects, specific expressions, or user inquiries input in a way not generally understandable out of context.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In general, the present technology provides for an example-driven machine learning scheme for creating custom dialog system engines and one or more knowledge databases associated therewith.

According to some example aspects of present disclosure, there is provided a system and a method for example-driven machine learning. The method may commence with maintaining a plurality of dialog system rules within a dialog system engine. The dialog system rules can stipulate instructions for response of the system to particular user requests received from the dialog system interface. The method can continue with maintaining a knowledge database that includes one or more context expressions associated with at least one dialog system rule. Context expressions may relate to terms, keywords, phrases, variables, and/or speech expressions associated with at least one "entity" and/or at least one "intent" of a particular dialog system rule.

The method can further include receiving an exemplary phrase and retrieving certain linguistic elements from the exemplary phrase. It can be determined that one of the linguistic elements is directed to at least one of a plurality of intent objects or a plurality of entity objects of certain dialog system rules. The linguistic element in association with the at least one dialog system rule may be added to the knowledge database. Thus, machine learning using exemplary phrases can occur.

Further, user requests acquired by the dialog system interface can be received. User requests can optionally be pre-processed by the dialog system interface. For example, the dialog system interface can recognize spoken words and transform speech user input into a text-based user input. In some embodiments, user requests can be accompanied with attributes related to current conditions including, for example, current geographical location of user, currently used software or mobile application, user motions, user movement direction, date, time, weather information, and so forth. Based on the user request and/or attributes thereof, the server or the dialog system interface may assign a particular dialog context label to the user request.

Further, the user request can be processed by applying one of dialog system rules if the user request is properly interpreted by the server. In some embodiments, one or more statistical or heuristic matching algorithms can be applied to the user request. Otherwise, if the server determines that the user request cannot be interpreted out of context if taken in isolation, a context expression (stored in the knowledge database) that is associated with at least a portion of the user request and/or the dialog context label can be identified. The method can continue with selecting, from the plurality of dialog system rules, a particular dialog system rule that is associated with the identified context expression or the dialog context label, depending on an implementation.

Further, a response to the user request can be generated by applying the selected dialog system rule to at least a portion of the user request. The response can be transferred to or presented via the dialog system interface to the user.

The system for example-driven machine learning may include a dialog system engine running on a server and a dialog system interface running on a client side. In some aspects of the present disclosure, the system for example-driven machine learning allows software or mobile application developers (hereinafter simply referred to as "developers") to create custom dialog system engines including specific dialog system definitions or rules and associate them with custom knowledge database elements. The system allows creating and/or populating (editing, managing) custom knowledge databases by developers. The population of custom knowledge databases can occur when developers or even end users provide example phrases or exemplary phrases. Upon receipt of such exemplary phrases, the system retrieves from them one or more linguistic elements (and/or one or more linguistic patterns). Further, the system determines that each linguistic element is directed or associated with a particular dialog system rule; namely, each linguistic element is associated with a particular intent and/or entity of a dialog system rule. Further, the system may add these linguistic elements to the knowledge database and associate them with this particular dialog system rule.

In certain additional embodiments, the system is configured to provide markup language of linguistic elements for review prior to adding them to the knowledge database. Thus, the developers can ensure that linguistic elements have been correctly identified, interpreted, or associated. In other embodiments, the developers can correctly identify linguistic elements or amend their association. For example, if a particular linguistic element, such as "yesterday," can be associated with several dialog system rule elements, such as "Date" entity, "Time Period" entity, or "Song Title" entity, then the developers can select a particular dialog system rule element to which this linguistic element should relate. For these ends, the system can display all appropriate dialog system rules and their elements so that the developer can select a desired one. Otherwise, the linguistic element "yesterday" can be assigned to a default dialog system rule (e.g., the most common dialog system rule or first in a list rule). The developers can change this assignment anytime later or make other changes.

Therefore, the present technology allows improving accuracy of processing user requests by dialog system engines including even such user requests that are not generally understandable out of context. Automatic enhancement of knowledge databases allows for on-going improvement of dialog system engines, which ultimately leads to the improvement of natural language processing (NLP) accuracy. Additional objects, advantages, and novel features will be set forth in part in the detailed description, which follows, and in part will become apparent to those skilled in the art upon examination of the following detailed description and the accompanying drawings or may be learned by production or operation of the example embodiments. The objects and advantages of the concepts may be realized and attained by means of the methodologies, instrumentalities, and combinations particularly pointed out in the appended claims.

Other example embodiments of the disclosure and aspects will become apparent from the following description taken in conjunction with the following drawings.

BRIEF DESCRIPTION OF THE DRAWINGS

Embodiments are illustrated by way of example and not limitation in the figures of the accompanying drawings, in which like references indicate similar elements and, in which:

FIG. 4 shows the process of manual creation of entities via the developer interface, in accordance with some example embodiments.

FIG. 12, FIG. 13, FIG. 14, FIG. 15, and FIG. 16 show various screenshots of developer interface 112 illustrating creation of entities.

DETAILED DESCRIPTION

Figure 1:
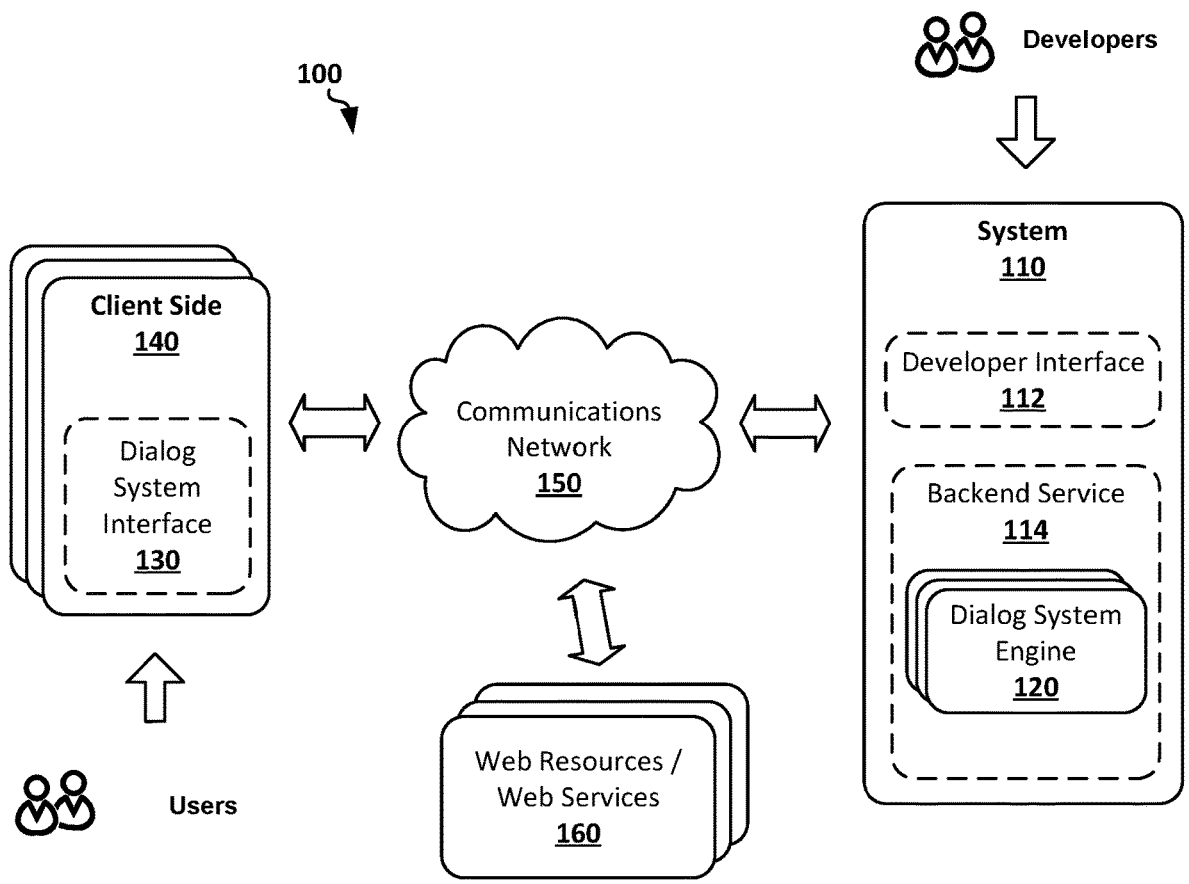
FIG. 1 illustrates an environment within which systems and methods for example-driven machine learning can be implemented, in accordance with some embodiments.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter.

The embodiments can be combined, other embodiments can be utilized, or structural, logical and operational changes can be made without departing from the scope of what is claimed. The following detailed description is, therefore, not to be taken in a limiting sense, and the scope is defined by the appended claims and their equivalents.

The system for example-driven machine learning enables software or mobile application developers to create custom dialog system engines that operate as a backend service for dialog system interfaces, which can be an integral part of software applications, mobile applications, websites, or web services. This disclosure is also directed to methods for enhancing a knowledge database used by dialog system engines through automatic processing of expression examples using machine learning schemes, statistical or heuristic algorithms, and/or pattern mining schemes.

Present teachings may be implemented using a variety of technologies. For example, the methods described herein may be implemented in software executing on a computer system or in hardware utilizing either a combination of microprocessors or other specially designed application-specific integrated circuits (ASICs), programmable logic devices, or various combinations thereof. In particular, the methods described herein may be implemented by a series of computer-executable instructions residing on a transitory or non-transitory storage medium such as a disk drive or computer-readable medium. It should be noted that methods disclosed herein can be implemented by a computer (e.g., a desktop computer, tablet computer, laptop computer), game console, handheld gaming device, cellular phone, smart phone, smart television system, and so forth.

The term "application developer," or simply "developer," refers to one or more of the following: software developer, mobile application developer, software engineer, software owner, mobile application owner, software manager, mobile application manager, dialog system owner, and so forth. An application developer develops and/or manages a dialog system engine and/or dialog system interface.

The term "dialog system" refers to one or more of the following: chat information system, spoken dialog system, conversational agent, chatter robot, chatterbot, chatbot, chat agent, digital personal assistant, automated online assistant, and so forth. Each dialog system includes a "dialog system interface" and "dialog system engine." Each of these elements can be customized by the application developer.

The term "dialog system interface" refers to a computer-human interface, which is configured to acquire user inputs in the form of audio messages or text messages, and deliver dialog system responses to the users in the form of audio messages or displayable messages. In one example, a dialog system interface may be implemented as a widget employed to or integrated with a software application, mobile application, middleware application, firmware application, website, and web service, to provide a computer-human interface for acquiring user requests and delivering dialog system outputs to the users.

The term "dialog system engine" refers to a software application configured to process user inputs and to generate responses thereto. In one example, dialog system engine refers to a computer-enabled or processor-enabled system for supporting an associated dialog system interface by processing user requests and generating corresponding responses thereto.

As outlined above, the present technology provides for a system for example-driven machine learning enabling creation of custom dialog system engines serving as backend services for custom dialog system interfaces. The present technology also provides for automatic enhancement of a knowledge database for custom dialog system engines based on example user requests provided by developers.

In general, the system allows for developers and engineers to create custom dialog system engines that will support frontend dialog system interfaces. For example, if a software developer wants to integrate dialog system functionality into a mobile application as an additional feature, the developer can use the system to create and deploy a custom dialog system engine and link it with the mobile application. The mobile application, in turn, can have only the dialog system interface. In this example, the dialog system interface can be activated by a user when he interacts with the mobile application. The user can make inquiries via the dialog system interface in the form of voice inputs or text inputs. Upon receipt of a user inquiry, the dialog system interface can transfer it with little or no pre-processing to the linked custom dialog system engine. The dialog system engine processes the received user inquiry, interprets it, and generates a response to the inquiry based on predetermined rules and settings. The response is delivered back to the dialog system interface for further visual and/or audio presentation to the user.

Dialog system interfaces can be integrated into or be an integral part of a wide range of software applications running on a client device, such as personal computer (PC) or cellular phone, or on a server so that the dialog systems become a part of a website or web service. Dialog system engines can be implemented on a server such that their functionalities can be accessible to the dialog system interfaces over a network, for example the Internet, cellular networks, or any other communications means. In additional embodiments, a dialog system interfaces and dialog system engine run on a single device (i.e., a PC or mobile application).

Each dialog system engine may include a plurality of dialog system rules. Further, each of the dialog system rules includes dialog system elements such as "intents" and "entities," and may also include some variables, links, parameters, and so forth. Accordingly, when a developer creates a dialog system engine, he creates and/or edits a plurality of intents and a plurality of entities and associates them with each other. In some embodiments, developers can use ready-to-use libraries of intents or entities, or developers can create intents and entities themselves. In some embodiments, intents and entities can be automatically generated when the developer provides example phrases or example dialogs that relate to possible use requests. These and other aspects of the present technology are described below with reference to accompanying drawings.

FIG. 1 shows a high-level block diagram of example system environment 100 suitable for practicing the present technologies. As can be seen on FIG. 1, there is provided a system 110 for example-driven machine learning to create and maintain dialog system engines 120. For these ends, system 110 includes developer interface 112 for online creation and managing of dialog system engines and backend service 114 for maintaining and running the dialog system engines 120.

Developer interface 112 may include a graphical user interface (GUI) embedded into a webpage and accessible by developers via the Internet. In some other embodiments, however, developer interface 112 may be implemented as a software application such as a downloadable software application or any other software, middleware, or firmware running on or accessible from an electronic device such as a computer. In the example shown in FIG. 1, developer interface 112 is realized as a web accessible GUI as will be described below. For simplicity, this disclosure is limited to such embodiments where developer interface 112 is a server based solution so that it is accessible via the Internet. Regardless of a particular implementation, developer interface 112 enables developers through a number of GUI tools to create one or more dialog system engines 120.

Still referencing FIG. 1, backend service 114 is responsible for maintaining and running custom dialog system engines 120 that are created, for example, by or with the help of developer interface 112. Backend service 114 may operate as a web service providing functionality to custom dialog systems by enabling their dialog system interfaces to interact with dialog system engines 120 maintained at backend service 114.

As briefly discussed above, dialog system interfaces 130 can be provided on a client side 140. Dialog system interfaces 130 may be as simple as a GUI enabling users to make inquiries, which are then delivered to backend service 114 for processing by corresponding dialog system engines 120, and to receive responses to the inquires generated by dialog system engines 120. Dialog system interfaces 130 may be implemented as stand-alone software applications or they can be an integral part of a software application, web service, website, and the like.

Still referencing FIG. 1, client side 140 may refer to, but not limited to, a user device, terminal, computing device (e.g., laptop computer, tablet computer, desktop computer), cellular phone, smart phone, personal digital assistant (PDA), gaming console, remote control, multimedia system, smart television device, set-top box, infotainment system, in-vehicle computing device, informational kiosk, robot, and so forth. In these embodiments, dialog system interfaces 130 may be implemented as software, middleware, or firmware installed on such devices.

In additional embodiments, client side 140 may refer to a networked or online solution such as a server, hosting service, web service, website, cloud service, and so forth. For example, dialog system interface 130 can be a widget or GUI provided on one or more web pages enabling end users to make inquires and get responses thereto. This option is suitable for those instances when a developer, for example, wants to integrate a dialog system into his website to provide enhanced customer service.

As can be seen in FIG. 1, the interaction between dialog system interfaces 130 and corresponding dialog system engines 120 is performed via a communications network 150. Communications network 150 may include one or more of the Internet, intranet, cellular network, LAN, WAN, IEEE 802.11 based network, and so forth.

FIG. 1 also shows various third party web resources/web services 160 provided via one or more web servers. These third party web resources/web services 160 can provide information of various types to dialog system engines 120 or dialog system interfaces 130 as a part of a response to a user request. For example, web resources/web services 160 may refer to email services, weather services, navigation services, and the like. Accordingly, if a user makes the inquiry "What is the weather like today?," such information may be automatically acquired by dialog system engine 120 from one or more third party web resources/web services 160 and then integrated into a dialog system response to be delivered to the end user.

Figure 2:
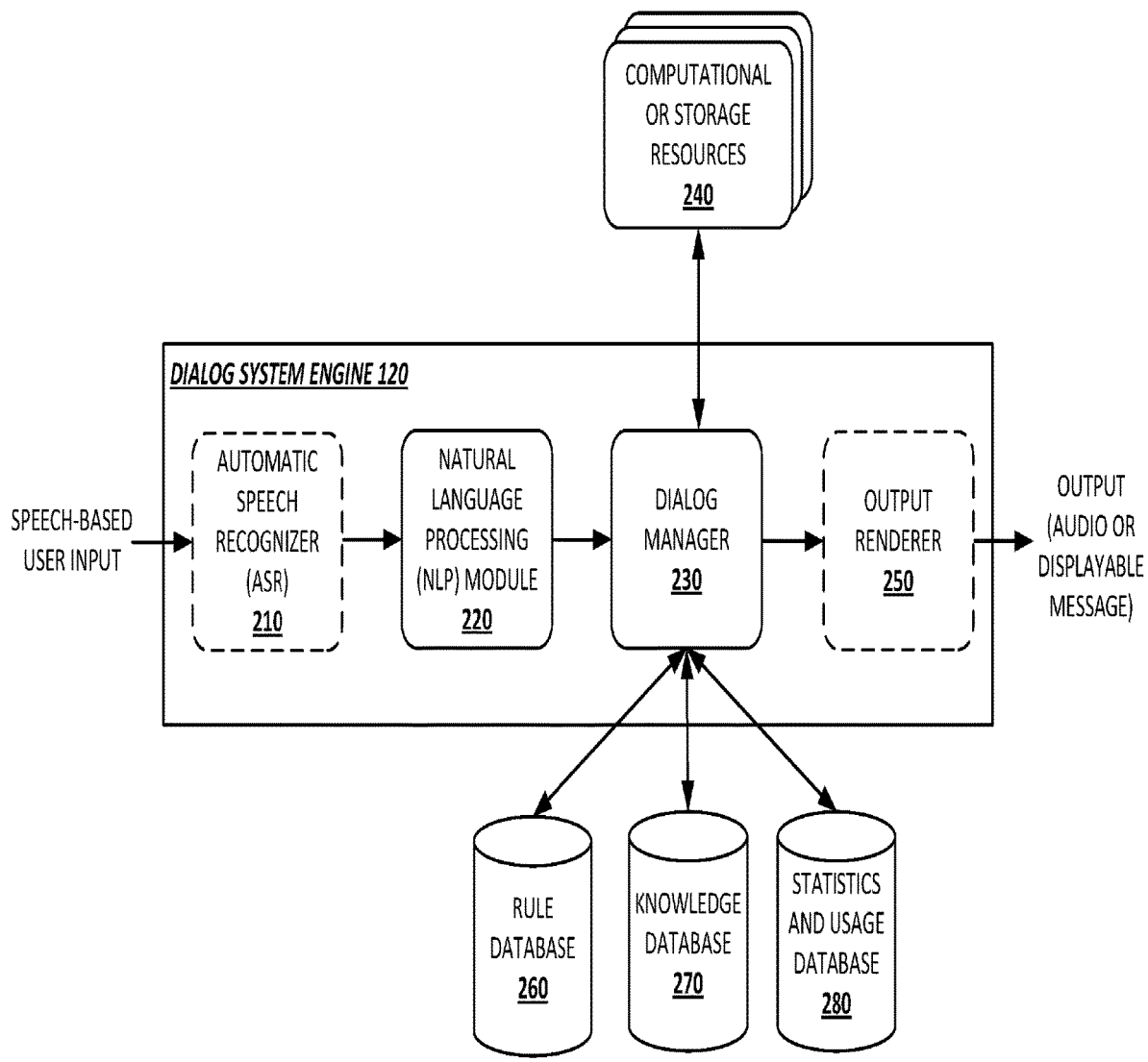
FIG. 2 is a block diagram showing various modules of a dialog system engine, in accordance with certain embodiments.

FIG. 2 shows a high-level architecture of exemplary dialog system engine 120, according to an example embodiment. It should be noted that every module of dialog system engine 120 or associated architecture includes hardware components, software components, or a combination thereof. Dialog system engine 120 may be embedded or installed in a user device or server, or may be presented as a cloud computing module and/or a distributed computing module.

In the embodiment shown, dialog system engine 120 includes optional Automatic Speech Recognizer (ASR) 210 configured to receive and process speech-based user inputs into a sequence of parameter vectors. ASR 210 further converts the sequence of parameter vectors into a recognized input (i.e., a textual input having one or more words, phrases, or sentences). ASR 210 includes one or more speech recognizers such as a pattern-based speech recognizer, free-dictation recognizer, address book based recognizer, dynamically created recognizer, and so forth. In some embodiments, ASR 210 is used not in dialog system engine 120, but in dialog system interface 130.

Further, dialog system engine 120 can include NLP module 220 for understanding spoken language input. Specifically, NLP module 220 may disassemble and parse the recognized input to produce utterances, which are then analyzed utilizing, for example, morphological analysis, part-of-speech tagging, shallow parsing, and the like. NLP module 220 may then map recognized input or its parts to meaning representations.

Dialog system engine 120 further includes dialog manager 230, which coordinates the activity of all components, controls dialog flows, and communicates with external applications, devices, services, or resources. Dialog manager 230 may play many roles, which include discourse analysis, knowledge database query, and system action prediction based on the discourse context.

In some embodiments, dialog manager 230 may contact one or more task managers (not shown) that may have knowledge of specific task domains. In some embodiments, dialog manager 230 may communicate with various computing, logic, or storage resources 240, which may include, for example, a content storage, rules database, recommendation database, push notification database, context database, electronic address book, email or text agents, dialog history database, disparate knowledge databases, map database, points of interest database, geographical location determiner, clock, wireless network detector, search engines, social networking websites, blogging websites, news feeds services, and many more. In some embodiments, computational or storage resources 240 include one or more web resources/services 160 discussed above.

Dialog manager 230 may employ multiple disparate approaches to generate outputs in response to recognized inputs. Some approaches include the use of predetermined rules, statistical analysis, machine-learning algorithms (e.g., neural networks), heuristic analysis, and so forth. Dialog manager 230 is one of the central components of Dialog System Engine 120. The major role of dialog manager 230 is to select the correct system actions based on observed evidences and inferred dialog states from the results of NLP (e.g., dialog act, user goal, and discourse history). In addition, dialog manager 230 should be able to handle errors when the user input has ASR and NLP errors caused by noises or unexpected inputs.

Dialog system engine 120 further includes optional output renderer 250 for transforming the output of dialog manager 230 into a form suitable for providing to the user. For example, output renderer 250 may employ a text-to-speech engine or may contact a pre-recorded audio database to generate an audio message corresponding to the output of dialog manager 230. In certain embodiments, output renderer 250 may present or cause to present the output of dialog manager 230 as a text message, image, or video message for further displaying on a display screen of a user device. In some embodiments, output renderer 250 is provided not in dialog system engine 120, but on client side 140.

Still referring to FIG. 2, dialog system engine 120 includes one or more dialog system rules maintained in at least one rule database 260. Dialog system rules may also be associated with dialog system elements discussed below.

Dialog system engine 120 may also include or be associated with one or more knowledge databases 270, which maintain a plurality of context description elements such as lists of terms, keywords, phrases, expressions, context variables, context parameters (e.g., geolocation, system rate, GUI, etc.) associated with one or more dialog system rules. In other words, knowledge databases 270 include information supporting the process of determining conversational or environmental context for particular user requests. In some embodiments, knowledge database 270 may store pre-built lexical data including, but not limited to, synonyms (words, phrases). In yet more embodiments, knowledge database 270 may also include pre-built knowledge databases such as WordNet or the like.

Dialog system engine 120 may also include or be associated with one or more statistics and usage databases 280, which are configured to aggregate statistical or usage information associated with the operation of dialog system engine 120 and/or associated dialog system interface 130 and/or associated mobile or software applications. For example, statistics and usage database 280 may accumulate dialog system logs, which can be later used for optimization of dialog system rules, dialog system responding schemes, training machine-learning algorithms if employed by the dialog system engine, and so forth.

The process of creating and operating custom dialog system engines 120 will now be described with reference to FIG. 1 and other drawings. In particular, developer interface 112 can provide one or more GUIs having a number of tools enabling developers to create and customize one or more dialog system elements, which serve as a basis for a custom dialog system engine.

According to various embodiments, dialog system elements include "entities" and "intents." Each entity may refer to a number of objects having the same or similar characteristics. In other words, entities are lists of terms and/or keywords defining objects of one class. In one example, an entity may refer to a keyword and a set of its synonyms. In another example, an entity may refer to a keyword and a set of its definitions. In yet another example, an entity may refer to a list (e.g., a list of cities, list of names, list of titles, list of brands, list of street names, and so forth).

In some embodiments, each entity can have a title. For example, one entity can be titled as "city" and it will contain a list of cities such as Alexandria, Arlington, Boston, and so forth. In other embodiments, an entity can be titled as a keyword and it can contain synonyms and/or definitions of this keyword. In one example, the entity called "music" may include the terms of song, singer, singing, musician, and so forth. In another example, the entity called "artist" may include a list of music bands, music ensembles, or music artists. In another example, the entity called "Beatles" may include a list of possible synonyms, such as "The Beatles," "Beatles," "Fab Four," "Liverpool Legends," "John Lennon," and so forth. In yet another example, there can be an entity called "Artist" which may include various artist names, artist name synonyms, music band names, and so forth.

In some embodiments, dialog system engines may include a number of default, pre-configured entities and/or intents. These can include common types of entities or intents related to such concepts as time, date, location, and the like. For example, when a developer creates a new dialog system engine, it may already have a few entities of common types such as a "@System.Date" entity. This entity covers linguistic constructs related to particular dates and may include the following terms: "today," "tomorrow," "next week," "January 1," "January 1 of next year," "next Monday," "the following Monday," and so forth.

Further, each intent of a dialog system rule includes a dialog system interaction scheme, which provides a particular relation between at least one user request and at least one dialog system linguistic response or fulfilment response. The dialog system interaction scheme can be represented by a rule based on a relationship between a particular action and at least one entity. Actions generally relate to formalized software objects such as JSON (JavaScript Object Notation) objects causing at least one processor to generate linguistic or fulfilment responses associated with at least one entity. Accordingly, each intent can be represented as a logical relation between at least one action and at least one entity object, for example, as follows:

a) [Action] @[Entity]
b) [Action] @[Entities]
c) [Actions] @[Entity]
d) [Actions] @[Entities]
e) Text @[Entity]
f) Text @[Entities]
g) Text @[Entity] Text
h) [Action] Text @[Entity]

The procedures a) through d) mean that a particular Action or several Actions shall be performed by client side 140 and/or dialog system interface 130 with respect to a predetermined Entity or several Entities. For example, one intent may be represented as "Play @Artist," where @Artist is a developer-defined entity containing a set of artists. In this example, the intent orders the dialog system engine 120 to activate the playback of at least one Beatles song, depending on a context.

The procedures e) through h) mean that particular information in the form of text is provided with respect to a particular Entity. For example, the user request "Create a meeting with John at 1 p.m. tomorrow, please" may be presented as the following pattern: create a meeting @sys.any:subject @sys.date-time. Here, @sys.any:subject refers to an entity associated with a particular name, @sys.date-time refers to an entity associated with time and date, and the phrase "Create a meeting" refers to a predetermined action to be performed by a dialog system interface or dialog system engine using a certain mobile application, software application, or web service.

As mentioned above, a dialog system rule causes generation of linguistic response and/or fulfilment response as an answer to a user request. One example of linguistic response may include particularized content deliverable as an audio message or displayable message. Fulfilment responses refer to particular processor-executable instructions for one or more software applications, middleware, firmware, web service, and the like that cause implementation of a particular action. Some examples of fulfilment responses may include scheduling an event in a calendar mobile application, writing and sending a text message or email, searching for content at a web search service, building a route in a navigational software application, and so forth. In certain embodiments, at least some linguistic responses and/or fulfilment responses can be configured by developers. In other embodiments, at least some linguistic responses and/or fulfilment responses can be pre-configured and be available as default responses.

In certain embodiments of this disclosure, developers can provide not "entities" and "intents," but just example requests to illustrate intents and entities. In these embodiments, system 110 automatically determines, using machine-learning techniques or statistical/heuristic algorithms, what "entities" and "intents" are implied in example user requests and creates corresponding rules. For example, a developer may simply provide example requests, such as "Play Beatles" and "I'd like to listen to Madonna," and the system 110 can match "Beatles" and "Madonna" to existing entities (platform's or user's) and generate corresponding "[Action] @[Entity]" rules automatically.

Thus, developers can use developer interface 112 to generate a plurality of dialog system rules specific to a particular application or industry. These pluralities of entities and intents form dialog system rules (also referred to as dialog system elements) and enable custom dialog system engines to perform certain actions or generate certain outputs in response to a wide range of end user inputs.

Figure 3:
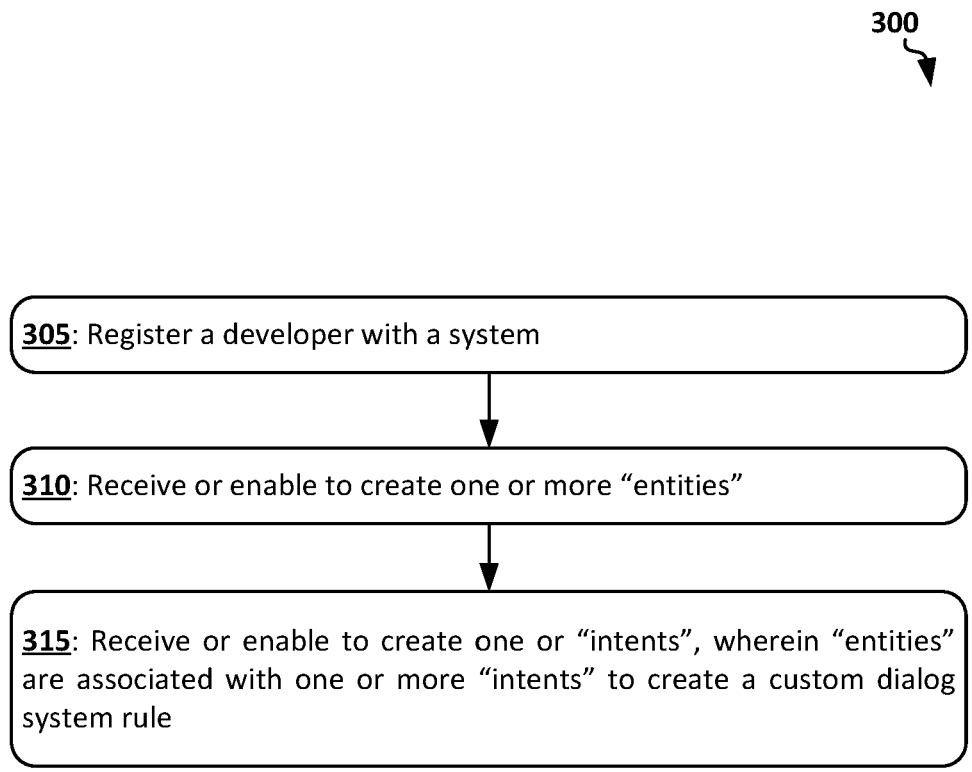
FIG. 3 is a flow chart illustrating a method for example-driven machine learning, in accordance with some example embodiments.

FIG. 3 is a process flow diagram showing method 300 for creating custom dialog system elements (rules) using system 110, according to an example embodiment. The method 300 may be performed by processing logic that may comprise hardware (e.g., decision-making logic, dedicated logic, programmable logic, and microcode), software (such as software run on a general-purpose computer system or a dedicated machine), or a combination of both. In one example embodiment, the processing logic refers to one or more components of system 110. Notably, below recited steps of method 300 may be implemented in an order different than described and shown in FIG. 3. Moreover, method 300 may have additional steps not shown herein, but which can be evident for those skilled in the art from the present disclosure. Method 300 may also have fewer steps than outlined below and shown in FIG. 3.

Method 300 commences at operation 305 when a developer registers with the system 110. For these ends, the developer interacts with the developer interface 112 using a plurality of online tools or widgets. The registration may include creating a developer profile, which can be maintained by system 110. The developer profile may virtually link (associate) a custom dialog system engine 120 of this developer and one or more dialog system interfaces 130 deployed on the client side 140. More specifically, a developer profile may include multiple agents (such as custom dialog system engines) and each of them could be integrated into a client application with the help of a Software Development Kit (SDK). Accordingly, there can be multiple end-points for user input (dialog system interfaces). The communication between dialog system engines 120 and dialog system interfaces 130 may include Application Programming Interface (API) codes, rules for interaction, destination addresses, and many more.

At optional operation 310, the system 110 receives, for example, via API, from the developer one or more entities and stores the same in one of the databases (e.g., rule database 260). In some embodiments, the entities are not received, but created by the developer using web tools of developer interface 112. In yet other embodiments, entities are not created or received at all because some agents, dialog system engines, or dialog system engine rules may not have any entities.

At operation 315, the system 110 receives, for example, via API, from the developer one or more intents and stores the same in one of the databases (e.g., rule database 260). In some embodiments, the intents are not received, but created by the developer using tools of developer interface 112. As described above, the intents, once created, are associated with the entities, and together they form dialog system elements (custom rules enabling a dialog system engine to generate responses tailored for specific needs). It should be noted that the developer may first create intents, and then he can create entities, which are later associated with the intents. In other words, operations 310 and 315 can replace each other.

Method 300 illustrates a set-up process for custom dialog system engine 120. The set-up process includes creating of dialog system rules by developers using the system 110. This process involves defining a set of entities, a set of intents, and association therebetween. Information related to intents and entities (e.g., context defining terms, keywords, phrases, variables, and/or expressions associated with certain dialog system rules or dialog system elements) can be stored in knowledge database 270.

FIGS. 4-7 illustrate various screenshots of developer interface 112 illustrating the creating of dialog system rules. FIG. 4 shows the process 400 of manually creating entities via the developer interface 112. In one example, one set of entities may include definitions of geographical locations including city names such as "Atlanta," "Belfast," "Boston," "Chicago," "Detroit," and so forth. In another example, another set of entities may include time definitions such as "today," "tomorrow," "next week," "next Monday," "October 1," and the like. It shall be clear that knowledge database 270 may include multiple sets of entities each related to various activities.

As illustrated, the entity related to city may be associated with multiple values, for example New York, Washington, Paris, and so forth. Each of the values may include a list of synonyms 410 and a singular reference value/canonical value 420. A developer can manage (add, edit, delete) the values of an entity and the list of synonyms 410 for each value.

Figure 5:
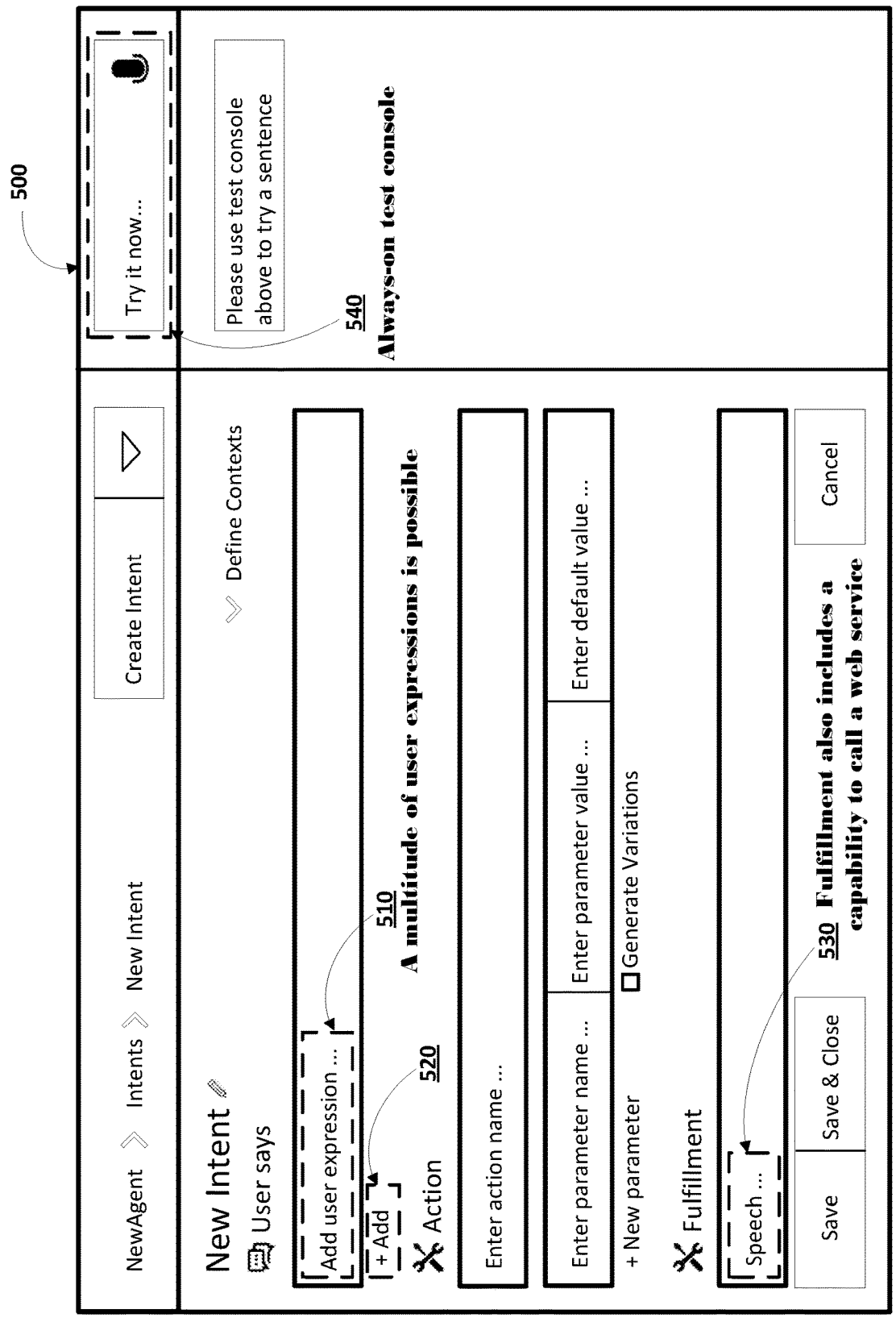
FIG. 5 shows the process of manual creation of intents for a dialog system rule, in accordance with some example embodiments.

FIG. 5 shows the process 500 of manually creating intents for a dialog system rule. Intents can be provided as multiple sets of linguistic elements such as words or phrases associated with particular actions. Some examples of intents associated with the action of playing multimedia content may include "Play," "Start playback," "Activate playing," "Open," and so forth. Additionally, knowledge database 270 may also store multiple context words or phrases, such as "what about," "and how is it in," "and the same in," "and what about," and so forth, all associated with a particular dialog system rule. These context phrases can facilitate interpretation of user inputs. In some embodiments, knowledge database 270 may also store pre-built lexical data including, but not limited to, synonyms (words, phrases). In yet more embodiments, knowledge database 270 may also include pre-built knowledge databases such as WordNet or the like.

FIG. 5 illustrates an intent including a multitude of user expressions 510 identified automatically from exemplary phrases or specified by a developer, for example, by adding a new user expressions using an Add control 520. On fulfillment 530 of the rule associated with the intent, the system may provide a speech string or call a web service. Additionally, a developer can test the rule execution by entering a test phrase in an always-on test console 540.

Figure 6:
FIG. 6 shows an example rule for receiving a weather forecast, in accordance with some example embodiments.

FIG. 6 shows an example rule 600 for receiving a weather forecast. As illustrated, the rule 600 includes multiple user expressions 610 that can be used by the user to request a weather forecast, such as "what is the weather in," "weather forecast for," and so forth. Entities, such as city or date, in user expressions can be provided using an alias 620 (or placeholder). Aliases can be referenced in action 630 and in fulfillment 640 sections. A developer can manage user expressions, 610, actions, and fulfillment parameters.

New dialog system rules including intents and entities are stored in knowledge database 270. One way to create new dialog system rules is a manual input of intents and entities, including specification of references to entities within intents. However, this approach may not be effective in certain instances and may have some disadvantages. For example, it can be very time consuming for developers to specify various natural language inputs to cover the wide range of inputs of which a certain user request could be made. The present technology addresses this problem by automatically creating dialog system rules by system 110 in response to receiving exemplary user requests from developers and/or analyzing requests from multiple dialog system users. Embodiments of this disclosure provide for knowledge database 270 to be automatically populated with certain additional terms, keywords, phrases, and/or expressions using machine-learning and/or pattern recognition techniques when developers input exemplary user requests that potentially could be used by end users in the course of interaction with dialog system.

For example, developers may provide exemplary phrases such as "What is the weather like in New York," "What is the current temperature in Las Vegas," "What is the forecast for Washington D.C.," "How it is in Moscow," "Do I need my umbrella tomorrow," and so forth. These and other exemplary phrases can be provided via developer interface 112 and/or during the interaction of a developer or end user with dialog system engines 120.

Once exemplary phrases are acquired, system 110 retrieves from them one or more linguistic elements. With reference to above provided examples, one set of linguistic elements may refer to cities including New York, Las Vegas, Washington D.C., and Moscow. A second set of linguistic elements may refer to articles, prepositions, and postpositions such as "a," "the," "for," and so forth. A third set of linguistic elements may refer to verbs and nouns defining weather context such as "how is it in," "what is weather like in," and so forth.

Further, system 110 associates sets of linguistic elements with particular dialog system rules or particular dialog system elements (entities or intents) and stores them in knowledge database 270. In the examples discussed above, the first set of linguistic elements can be associated with the "City" entity. Similarly, the third set of linguistic elements can be associated with the "Weather" intent.

Therefore, dialog system rules can be automatically created by developers by providing exemplary phrases to system 110. In some embodiments, however, dialog system rules can also be created by users. This dialog system learning approach may be useful in those instances when the dialog system cannot properly address certain user requests. Here, the users may instruct the dialog system to update its knowledge database 270 by introducing new intents or elements. For example, one user may instruct the dialog system to interpret the word "home" as New York City. This learning approach may affect all users or just those users that created such interpretations.

In one important aspect of this technology, when sets of linguistic elements are identified and retrieved from exemplary phrases input by developers as discussed above, system 110 generates a markup language of dialog system elements for review by the developers. In the example discussed above, the markup language may be presented in the following format [Weather] @[City]. The GUI of developer interface 112 may show the markup language to developers and provide tools for its correction. In the GUI, input phrases can be shown as is with appropriate highlighting or labels. For example, the input phrase "What is the weather like in New York?" can be shown in the GUI of developer interface 112, where the term "New York" can be highlighted and accompanied by a GUI showing that New York was identified as an entity @city. Accordingly, the developers can correct the markup language, for example, when system 110 for some reason incorrectly interprets the exemplary phrases or incorrectly identifies intents or entities. Moreover, the developers may configure linguistic (lexical) or fulfilment responses to just create dialog system rules and create dialog system rules based on developer requests using the tools of developer interface 112.

In another aspect, when intents or entities are identified by system 110 based on processing of exemplary phrases, it may be possible that a phrase may refer to a plurality of intents (or entities). For instance, when a developer provides an exemplary phrase "Send a message to John that I am going to be late," the linguistic element "Send a message" may properly relate to several intents including a first intent to generate and send an email, a second intent to generate a text message and send it over a cellular network in the form of a short message service (SMS), a third intent to generate and send a communication over a messenger agent, or a fourth intent to generate and send a communication via a social media site. In this example, the developer can make changes to the markup language of interpreted exemplary phrase and indicate to which intent he wants this phrase to relate. This process can be as simple as checking boxes or making selections via the GUI of system 110. In some embodiments, if no selection is made by the developer, the system 110 can associate such vague phrases as "Send a message" to a default intent, a first in a list of intents, a preferred intent, or all applicable intents. The developer is able to correct this selection at later time.

In yet another aspect, lexical examples provided by the developer or user can be added to existing intents without matching to a given set of intents. For example, a developer may decide to associate and unite the phrase "What's the weather like" and "Should I take my umbrella with me" into a single intent by just knowing that these two questions should result in the same dialog system action. Accordingly, the need of the same action for these two phrases can associate them together in a particular intent.

In another aspect, knowledge database 270 may lack some sets of intents or entities that the developers want to populate with definitions. In this case, system 110 is configured to identify one or more common linguistic (lexical) patterns or constructs among multiple exemplary phrases provided by developers and/or by various dictionaries, pre-built system intents, pre-built knowledge databases, and so forth. Based on this common linguistic pattern or construct, the platform may create a new dialog system rule and ask the developer of such a new rule to create and store the new dialog system rule in knowledge database 270.

In yet another aspect, knowledge database 270 may be automatically updated by introducing new intents or entities that replicate existing intents or entities, but also include some non-significant modifications. For example, "Find" intent may include such phrases as "find," "search for," "look up," "google," and so forth. This intent can be automatically supplemented with additional phrases including "please find," "please search for," "could you please look up," and so forth.

Figure 7:
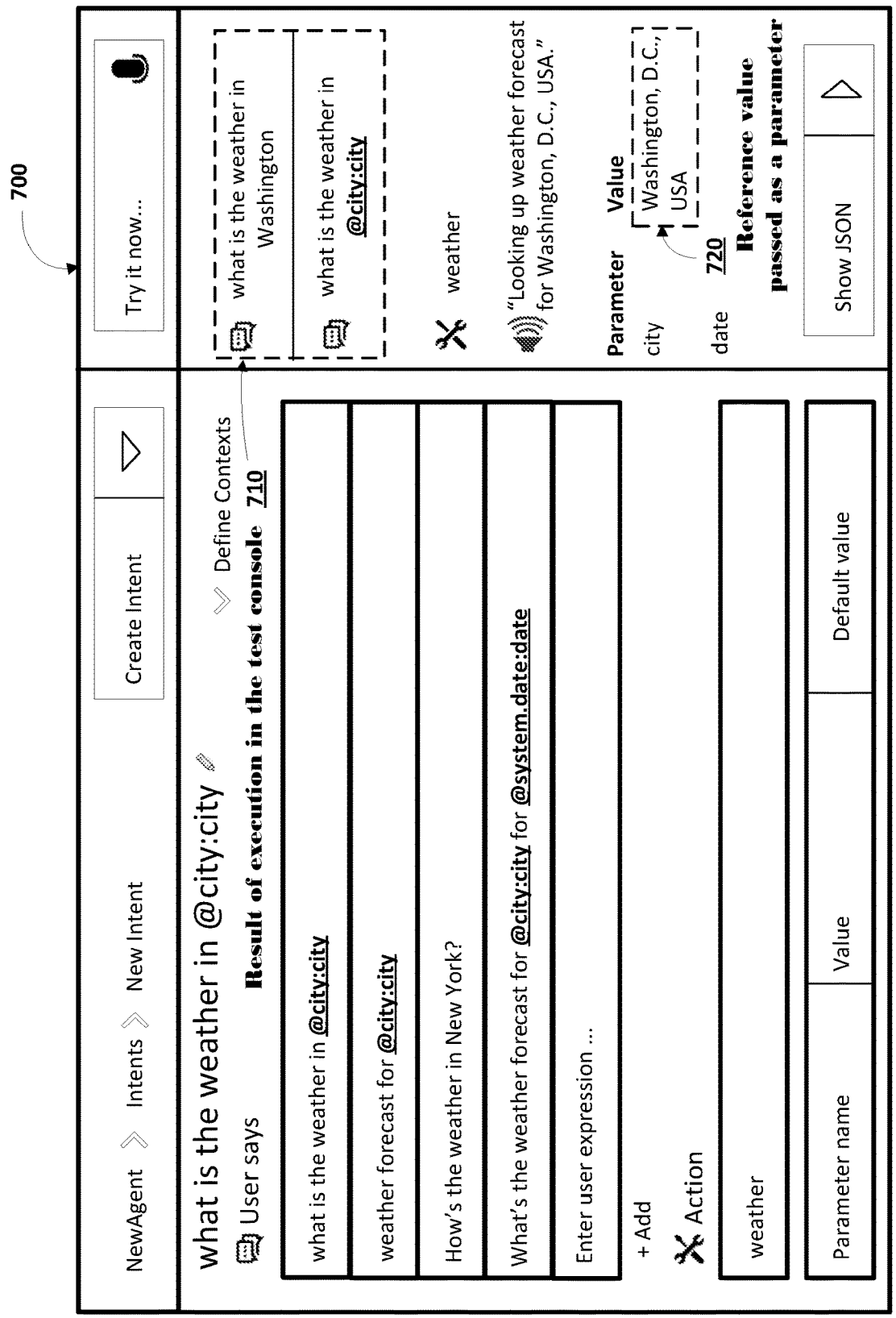
FIG. 7 shows a process of testing dialog system elements by developers, in accordance with some example embodiments.

FIG. 7 shows a process 700 of testing dialog system elements by developers. To test a rule, a developer can enter a test phrase in the test console. The test phrase may be processed 710 by the system to identify entities and an intent in the test phrase. The result of the processing can be provided to the developer for review. Based on the processing, action associated with the intent may be provided as a response to the test phrase with reference values of the entities passed as a parameter 720. The developer can modify the intent according to the test results.

Once all dialog system elements of dialog system engine 120 are created, they can be maintained as a backend service and enable any of the associated dialog system interfaces 130 to provide the full functionality of the dialog system to users according to predetermined settings.

Figure 8:
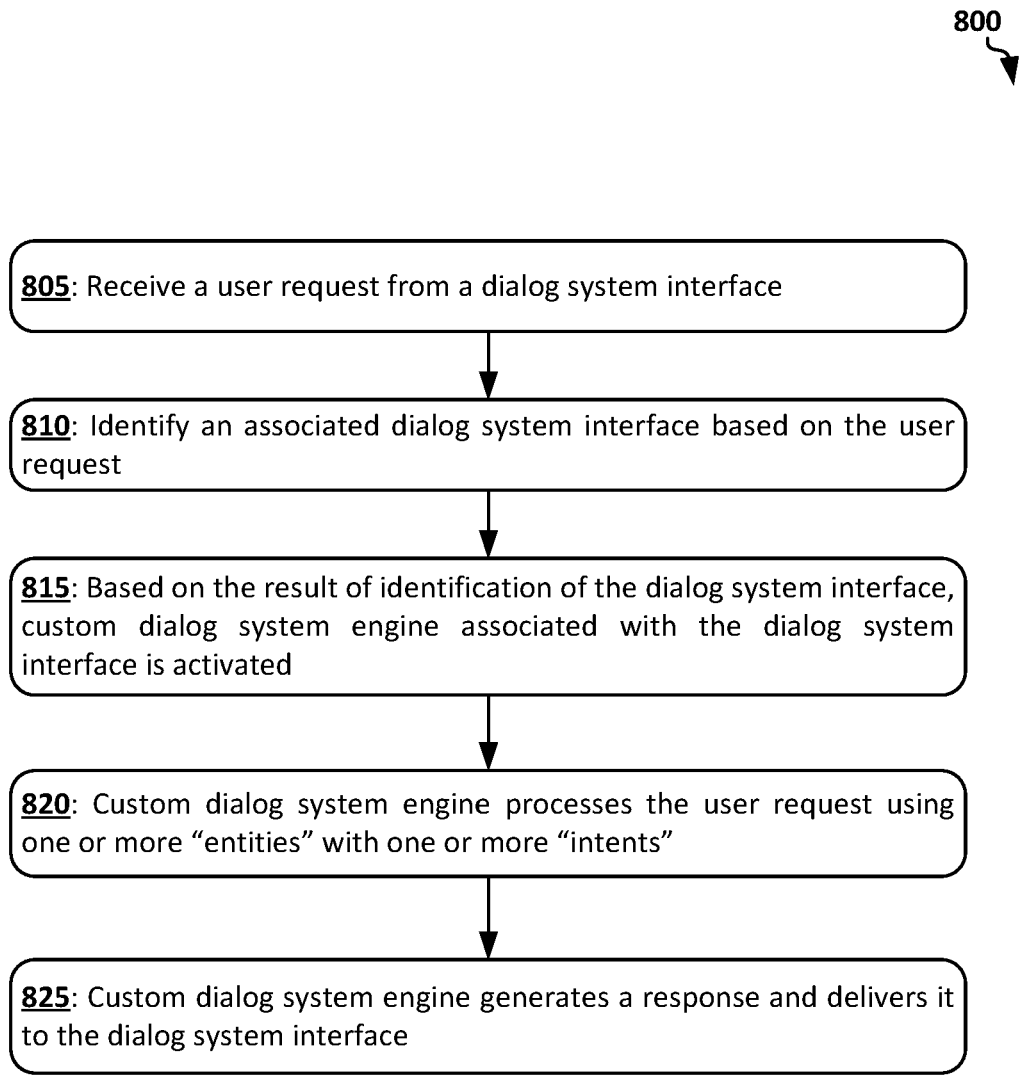
FIG. 8 shows an example process flow of a dialog system engine, in accordance with some example embodiments.

Example operation process of dialog system engine 120 is shown in FIG. 8. Method 800 of FIG. 8 may be performed by processing logic that may comprise hardware (e.g., decision-making logic, dedicated logic, programmable logic, and microcode), software (such as software run on a general-purpose computer system or a dedicated machine), or a combination of both. In one example embodiment, the processing logic refers to one or more components of the system 110. Notably, the below recited steps of method 800 may be implemented in an order different than described and shown in FIG. 8. Moreover, the method 800 may have additional steps not shown herein, but which can be evident for those skilled in the art from the present disclosure. The method 800 may also have fewer steps than outlined below and shown in FIG. 8.

At operation 805, system 110 receives a user request from an unidentified dialog system interface 130. The user request can be a voice input or text input. In some embodiments, dialog system interface 130 can pre-process the user input, for example, by recognizing spoken words and transforming the voice input into text input. In other embodiments, however, no pre-processing is performed by dialog system interface 130.

At operation 810, system 110 processes the user request and identifies dialog system interface 130. For these ends, the user request can be accompanied by an identifier (ID) at the time the user request is sent from dialog system interface 130 to system 110. Generally, identifiers may refer to (a) user ID, which can be used to retrieve a profile of a developer or user; (b) session ID, which can be used to retrieve current dialog context between the given user and the dialog system engine; and (c) a set of keys/agents (i.e., custom dialog system IDs), which can be used to identify entities, intents, and other data associated with the user request.

At operation 815, based on the result of the identification at operation 810, the system 110 activates the custom dialog system engine 120 associated with the identified dialog system interface 130. At the same operation, system 110 may also retrieve or identify one or more dialog system elements (i.e., one or more entities and one or more intents) based on the result of the identification at operation 810.

At operation 820, dialog system engine 120 processes the user request using identified dialog system elements (i.e., one or more entities and one or more intents) as retrieved at operation 810. Some examples of dialog system processing are further described with reference to FIG. 9.

At operation 825, dialog system engine 120 generates a response and sends it to dialog system interface 130 associated with dialog system engine 120. The response may include a text, audio, image, and/or video message, URL, callback URL, meta-data, computer-readable instructions, and so forth. Dialog system interface 130 then displays and/or playbacks the response to the user depending on predetermined settings.

Additional details related to the operation of system 110 and creating dialog system engines are provided in co-pending U.S. provisional patent application Ser. No. 62/050, 149, titled "Platform for Creating Customizable Dialog System Engines," filed on Oct. 21, 2014, which is incorporated herein in its entirety.

Figure 9:
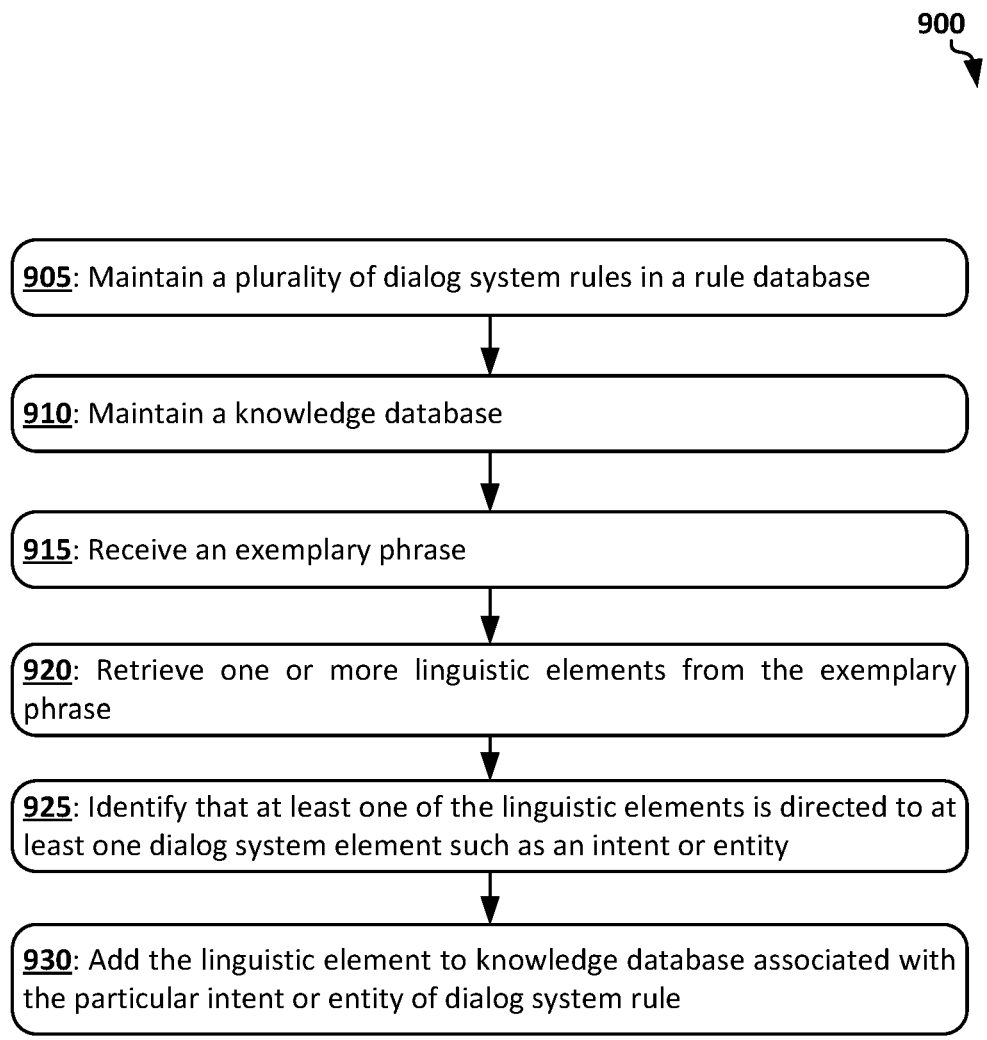
FIG. 9 shows a process flow diagram for the method of example-driven machine learning for a dialog system engine, in accordance with some example embodiments.

FIG. 9 shows a process flow diagram for method 900 of example-driven machine learning for a dialog system engine according to an example embodiment. The method 900 may be performed by processing logic that may comprise hardware (e.g., decision-making logic, dedicated logic, programmable logic, and microcode), software (such as software run on a general-purpose computer system or a dedicated machine), or a combination of both. In one example embodiment, the processing logic refers to one or more components of system 110. Notably, the below recited steps of method 900 may be implemented in an order different than described and shown in FIG. 9. Moreover, method 900 may have additional steps not shown herein, but which can be evident for those skilled in the art from the present disclosure. Method 900 may also have fewer steps than outlined below and shown in FIG. 9.

At operation 905, system 110 maintains a plurality of dialog system rules in one or more rule databases 260. As discussed above, each dialog system rule includes at least one "entity" and at least one "intent." Dialog system rules can be created by developers manually through developer interface 112 or automatically by dialog system engines 120 utilizing machine-learning or statistical algorithms.

At optional operation 910, system 110 maintains one or more knowledge databases 270. Each knowledge database 270 includes one or more context expressions, terms, variables, and/or phrases associated with at least one intent and/or at least one entity.

At operation 915, system 110 receives at least one exemplary phrase. The exemplary phrase can be provided by developers through developer interface 112 or by users using dialog system engine 120.

At operation 920, system 110 retrieves one or more linguistic elements from the exemplary phrase.

At operation 925, system 110 identifies that at least one of the linguistic elements is directed to at least one dialog system element such as an intent or entity.

At operation 930, system 110 adds the linguistic element to knowledge database 270 associated with the particular intent or entity of the dialog system rule. Alternatively, the linguistic element can be added manually by the developer. In this case, no automatic matching provided by operations 925 and 930 is performed; the developer simply updates one or more certain intents using the GUI of system 110.

Figure 10:
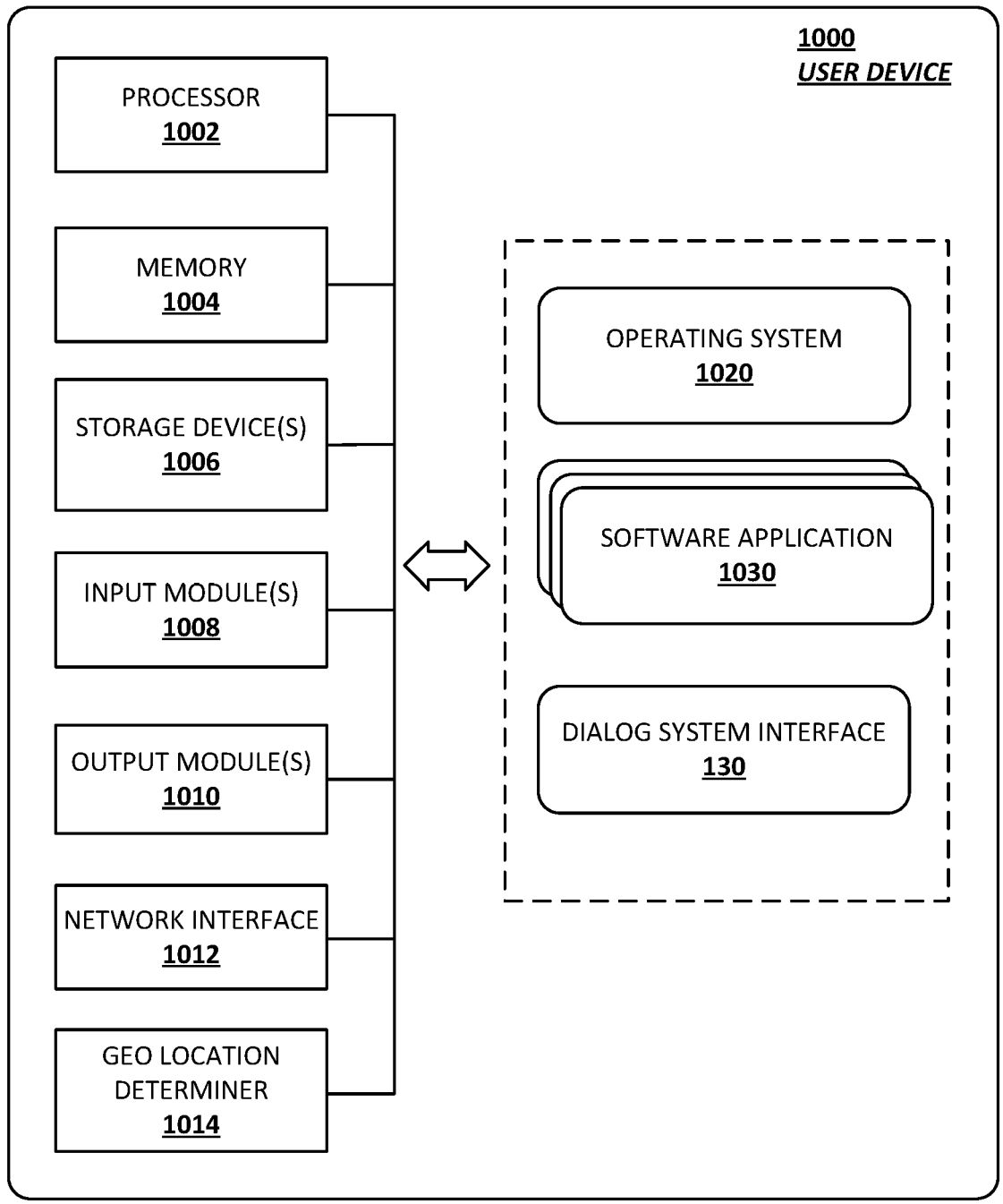
FIG. 10 is a high-level block diagram illustrating an example user device suitable for implementing the methods described herein.

FIG. 10 is a high-level block diagram illustrating an example user device 1000 suitable for implementing the methods described herein. It is worth mentioning that all components of the user device may include logic elements, hardware components, software (firmware) components, virtual components, or a combination thereof.

User device 1000 includes at least an integral part of one or more of a variety of types of devices and systems such as a general-purpose computer, desktop computer, server, computer network, network service, cloud-computing service, and so forth. Further, all modules shown in FIG. 10 may be operatively coupled using any suitable wired, wireless, radio, electrical, or optical standards. As already outlined above, user device 1000 may refer to a smart phone, wireless telephone, computer, such as a tablet computer or desktop computer, infotainment system, in-vehicle computing device, and the like.

As shown in FIG. 10, the user device 1000 includes the following hardware components: one or more processors 1002, memory 1004, one or more storage devices 1006, one or more input modules 1008, one or more output modules 1010, network interface 1012, and optional geo location determiner 1014. User device 1000 also includes the following software or virtual components: an operating system 1020, one or more software (mobile) applications 1030, and dialog system interface 130, which can be a stand-alone software application or be integrated into one or more software applications 1030. Dialog system interface 130 provides a human-centric interface for accessing and managing information as discussed herein, communicating with dialog system engine 120, and communicating with web resources/web services 160.

Processors 1002 are configured to implement functionality and/or process instructions for execution within user device 1000. For example, the processor(s) 1002 may process instructions stored in memory 1004 and/or instructions stored on storage devices 1006. Such instructions may include components of an operating system 1020 and dialog system interface 130. The user device 1000 may also include one or more additional components not shown in FIG. 10, such as a housing, power supply, communication bus, and the like. These elements are omitted so as to not burden the description of present embodiments.

Memory 1004, according to one example embodiment, is configured to store information within the user device 1000 during operation. Memory 1004 may refer to a non-transitory computer-readable storage medium or a computer-readable storage device. In some examples, memory 1004 is a temporary memory, meaning that a primary purpose of memory 1004 may not be long-term storage. Memory 1004 may also refer to a volatile memory, meaning that memory 1004 does not maintain stored contents when memory 1004 is not receiving power. Examples of volatile memories include random access memories (RAM), dynamic random access memories (DRAM), static random access memories (SRAM), and other forms of volatile memories known in the art. In some examples, memory 1004 is used to store program instructions for execution by the processors 1002. Memory 1004, in one example embodiment, is used by software (e.g., the operating system 1020) or dialog system interface 130 executing on user device 1000 to temporarily store information during program execution. One or more storage devices 1006 can also include one or more transitory or non-transitory computer-readable storage media and/or computer-readable storage devices. In some embodiments, storage devices 1006 may be configured to store greater amounts of information than memory 1004. Storage devices 1006 may further be configured for long-term storage of information. In some examples, storage devices 1006 include non-volatile storage elements. Examples of such non-volatile storage elements include magnetic hard discs, optical discs, solid-state discs, flash memories, forms of electrically programmable memories (EPROM) or electrically erasable and programmable memories (EEPROM), and other forms of non-volatile memories known in the art.

Still referencing FIG. 10, user device 1000 includes one or more input modules 1008. The input modules 1008 are configured to receive user inputs. Examples of input modules 1008 include a microphone, keyboard, keypad, mouse, trackball, touchscreen, touchpad, or any other device capable of detecting an input from a user or other source in the form of speech, audio, or tactile actions, and relaying the input to the user device 1000 or components thereof.

Output modules 1010, in some example embodiments, are configured to provide output to users through visual or auditory channels. Output modules 1010 may include a video graphics adapter card, liquid crystal display (LCD) monitor, light emitting diode (LED) monitor, sound card, speaker, or any other device capable of generating output that may be intelligible to a user.

User device 1000, in some embodiments, includes network interface 1012. Network interface 1012 can be utilized to communicate with external devices, servers, and networked systems via one or more communications networks such as one or more wired, wireless, or optical networks including, for example, the Internet, intranet, LAN, WAN, cellular phone networks (e.g. Global System for Mobile (GSM) communications network, packet switching communications network, circuit switching communications network), Bluetooth radio, and an IEEE 802.11-based radio frequency network, among others. Network interface 1012 may be a network interface card, such as an Ethernet card, optical transceiver, radio frequency transceiver, or any other type of device that can send and receive information. Other examples of such network interfaces may include Bluetooth®, 3G, 4G, and WiFi® radios in mobile computing devices as well as Universal Serial Bus (USB).

User device 1000 may further include optional geo location determiner 1014 for determining a current geographical location of the user device. Geo location determiner 1014 may utilize a number of different methods for determining geographical location including, for example, receiving and processing signals of Global Positioning Systems (GPS), GLONASS satellite navigation systems, or the Galileo satellite navigation system; utilizing multilateration of radio signals between radio towers (base stations); or utilizing geolocation methods associated with Internet Protocol (IP) addresses, Media Access Control (MAC) addresses, Radio-Frequency Identification (RFID), or other technologies.

Operating system 1020 may control one or more functionalities of user device 1000 or components thereof. For example, operating system 1020 may interact with dialog system interface 130 and may further facilitate one or more interactions between applications 1030 and one or more of processors 1002, memory 1004, storage devices 1006, input modules 1008, and output modules 1010. As shown in FIG. 10, operating system 1020 may interact with or be otherwise coupled to dialog system interface 130 and components thereof. In some embodiments, dialog system interface 130 can be included in the operating system 1020. Notably, user device 1000 and its components, such as the dialog system interface 130, may also interact with one or more remote storage or computing resources including, for example, web resources, websites, social networking websites, blogging websites, news feeds, email servers, web calendars, event databases, ticket aggregators, map databases, points of interest databases, and so forth.

Figure 11:
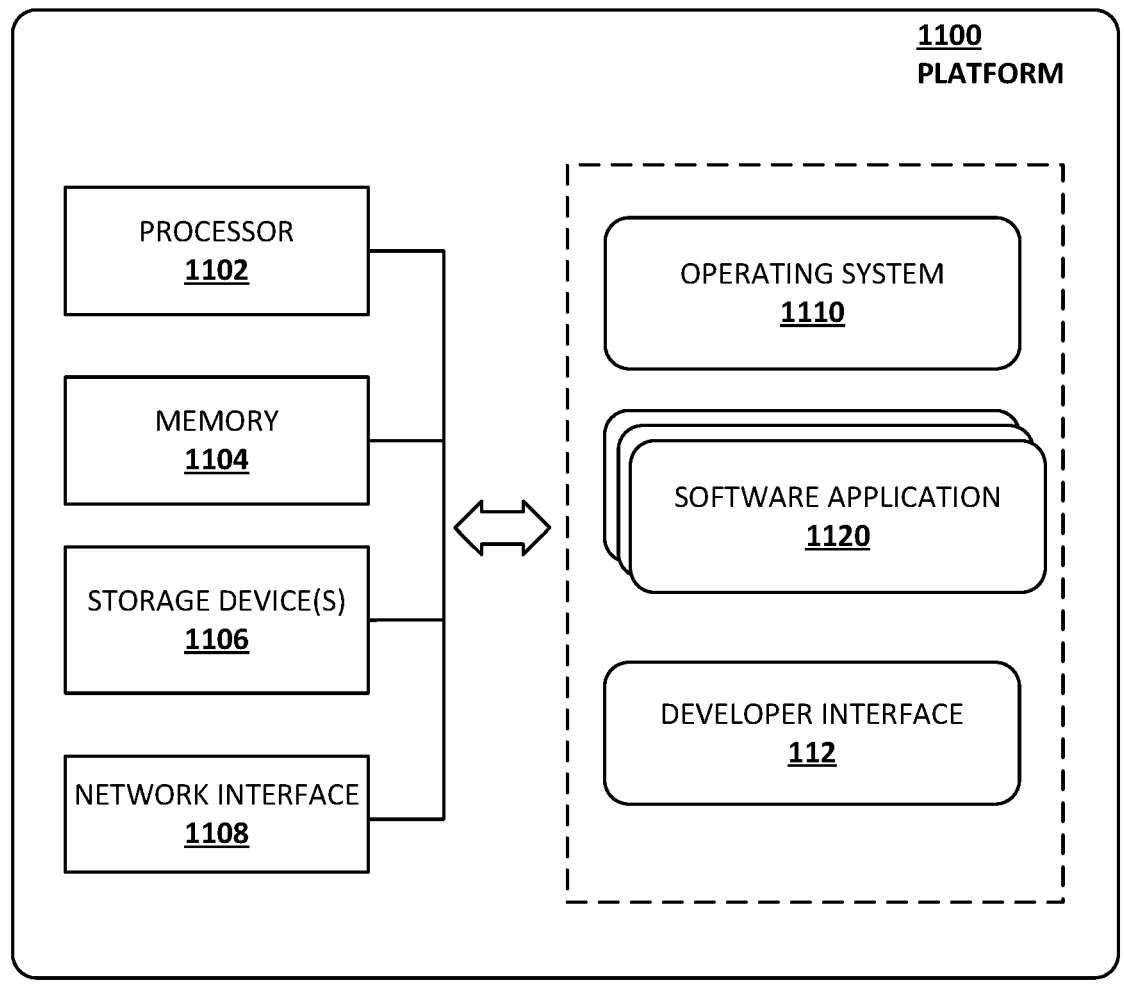
FIG. 11 is a high-level block diagram illustrating an example system suitable for implementing the methods described herein.

FIG. 11 is a high-level block diagram illustrating an example platform 1100 suitable for implementing the methods described herein. In particular, system 1100 is a server-based solution suitable for running system 110.

Note that all components of system 1100 include logic elements, hardware components, software (firmware) components, virtual components, or a combination thereof. System 1100 may include, relate to, or constitute an integral part of one or more of a variety of types of devices and systems such as a general-purpose computer, server, web server, network service, cloud-computing service, and so forth. Further, all modules shown in FIG. 11 may be operatively coupled using any suitable wired, wireless, radio, electrical, or optical standards.

As shown in FIG. 11, system 1100 includes the following hardware components: one or more processors 1102, memory 1104, one or more storage devices 1106, and network interface 1108. System 1100 also includes the following software or virtual components: operating system 1110, one or more software applications 1120, and developer interface 112. The developer interface 112 may provide a human-centric interface for accessing and managing information by developers (namely, for creating and managing dialog system engines 120).

In some embodiments, processor 1102 is configured to implement functionality and/or process instructions for execution within system 1100. For example, processor 1102 may process instructions stored in memory 1104 and/or instructions stored on storage devices 1106. Such instructions may include components of operating system 1110, applications 1120, and/or developer interface 112.

Memory 1104, according to some embodiments, is configured to store information within system 1100 during operation. Memory 1104 may refer to a non-transitory computer-readable storage medium or a computer-readable storage device. In some examples, memory 1104 is a temporary memory, meaning that a primary purpose of memory 1104 may not be long-term storage. Memory 1104 may also refer to a volatile memory, meaning that memory 1104 does not maintain stored contents when memory 1104 is not receiving power. Examples of volatile memories include RAM, DRAM, SRAM, and other forms of volatile memories known in the art. In some examples, memory 1104 is used to store program instructions for execution by processor 1102. Memory 1104, in one example embodiment, is used to temporarily store information during program execution.

One or more storage devices 1106 can also include one or more transitory or non-transitory computer-readable storage media and/or computer-readable storage devices. In some embodiments, storage devices 1106 may be configured to store greater amounts of information than memory 1104. Storage devices 1106 may further be configured for long-term storage of information. In some examples, storage devices 1106 include non-volatile storage elements. Examples of such non-volatile storage elements include magnetic hard discs, optical discs, solid-state discs, flash memories, forms of EPROM or EEPROM, and other forms of non-volatile memories known in the art. In one example, one or more storage devices 1106 can include databases 260, 270, 280 (i.e., they can store and maintain multiple dialog system rules, logs, context, etc.). In other embodiments, one or more storage devices 1106 can store and maintain user profiles and custom dialog system engines 120.

Still referencing FIG. 11, system 1100 includes network interface 1108. Network interface 1108 can be utilized to communicate with external devices, servers, and networked systems via one or more communications networks such as one or more wired, wireless, or optical networks including, for example, the Internet, intranet, LAN, WAN, cellular phone networks (e.g. GSM communications network, packet switching communications network, circuit switching communications network), Bluetooth radio, and an IEEE 802.11-based radio frequency network, among others. Network interface 1108 may be a network interface card, such as an Ethernet card, optical transceiver, radio frequency transceiver, or any other type of device that can send and receive information. Other examples of such network interfaces may include Bluetooth®, 3G, 4G, and WiFi® radios in mobile computing devices as well as USB.

Operating system 1110 may control one or more functionalities of system 1100 or components thereof. For example, operating system 1110 may interact with developer interface 112, and may further facilitate one or more interactions between applications 1120 and one or more of processors 1102, memory 1104, storage devices 1106, and/or network interface 1108. As shown in FIG. 11, operating system 1110 may interact with, or be otherwise coupled to, developer interface 112 and components thereof. Notably, system 1100 and its components may also interact with one or more remote storage or computing web resources/web services 160 including, for example, web resources, websites, social networking websites, blogging websites, news feeds, email servers, web calendars, event databases, ticket aggregators, map databases, points of interest databases, and so forth. Software applications 1120, in essence, may provide functionality to system 110 and/or developer interface 112 and enable their operation. Alternatively, software applications may be additions to system 110 and/or developer interface 112.

FIGS. 12-16 show various screenshots of developer interface 112 illustrating creation of entities. As illustrated in FIG. 12, developer interface 112 allows defining enumeration of entities if the entities do not have synonyms. For example, entities "red", "green", and "blue" are the entities that do not have synonyms. As shown, developer interface 112 allows expanding entities automatically. For example, if an entity "@color" contains colors "red", "green", an "blue", system 110 can automatically understand that "maroon" is also likely a color. As result, for an example pattern "I like @color" the phrase "I like cats" will not be matched while "I like maroon" will be matched.

Figure 13:
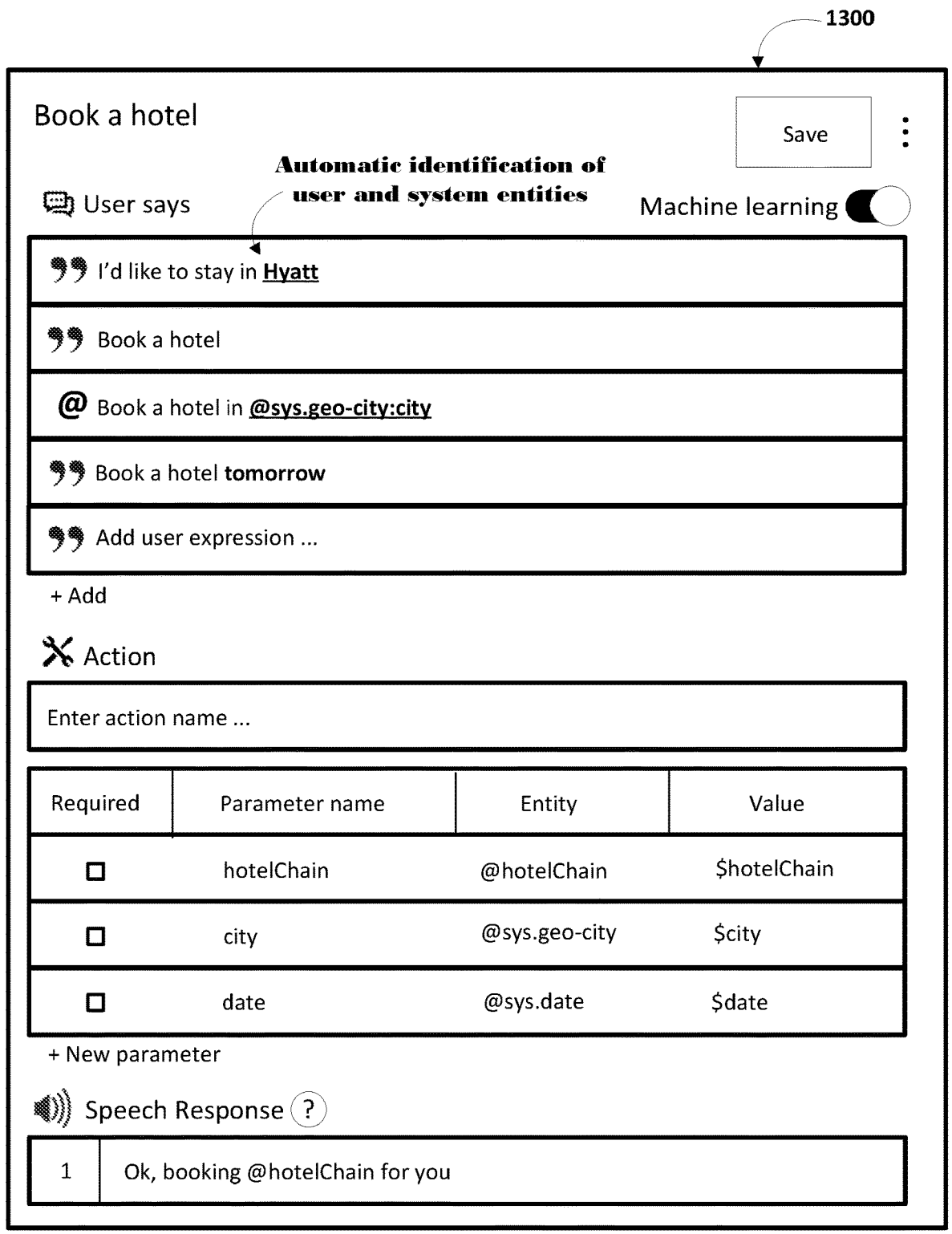

As illustrated in FIG. 13, developer interface 112 allows a developer to define both examples and patterns. The patterns may be marked by the "@" icon on the left. Examples may be marked by the ' "' icon on the left. In some embodiments, parts of examples are automatically identified and highlighted by the developer interface 112.

As illustrated in FIG. 13, developer interface 112 allows a developer to highlight part of an example and assign an entity type. The entity type can be selected or created via a context menu 1420.

Figure 14:
Figure 15:
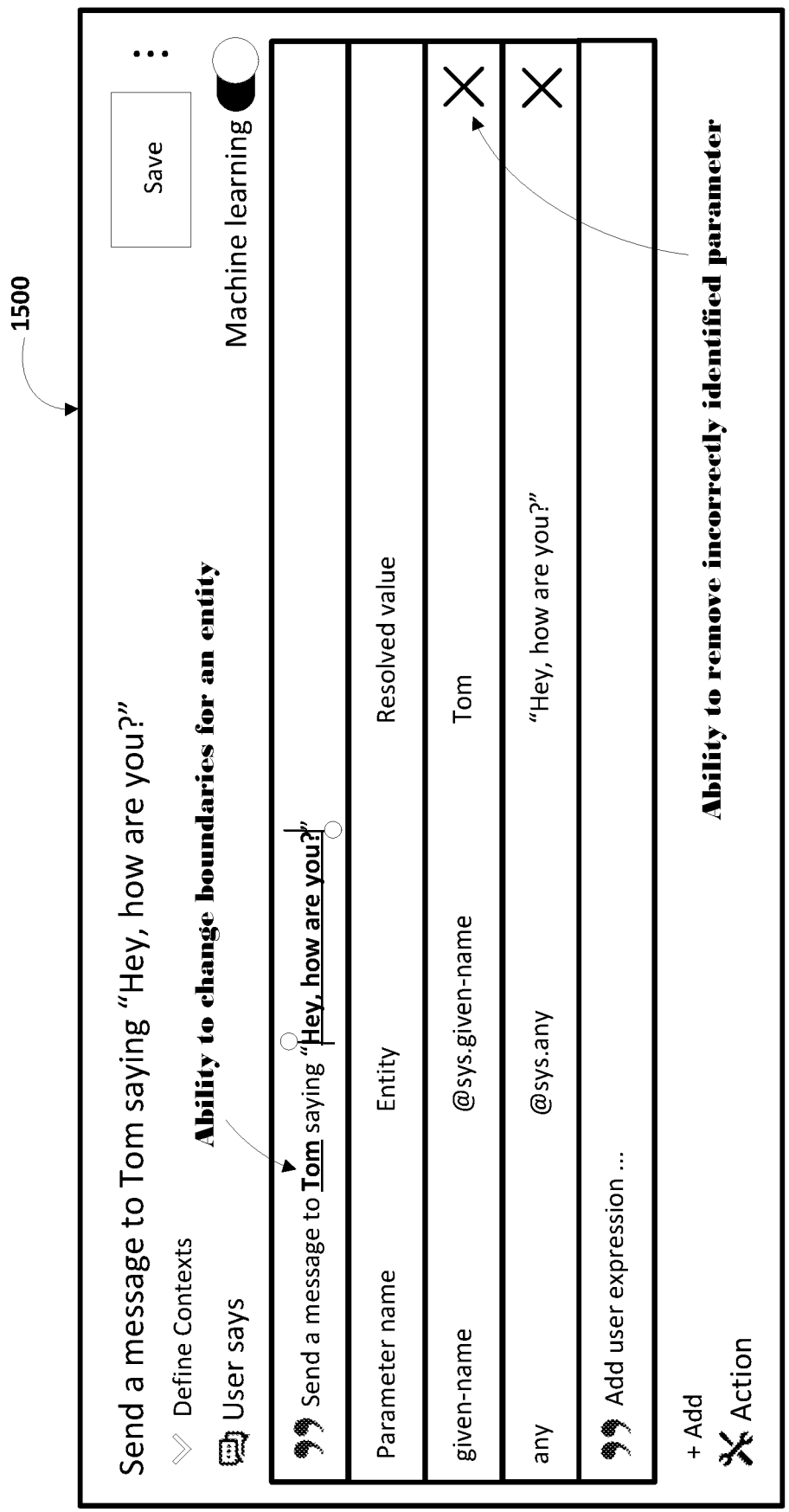
Figure 16:
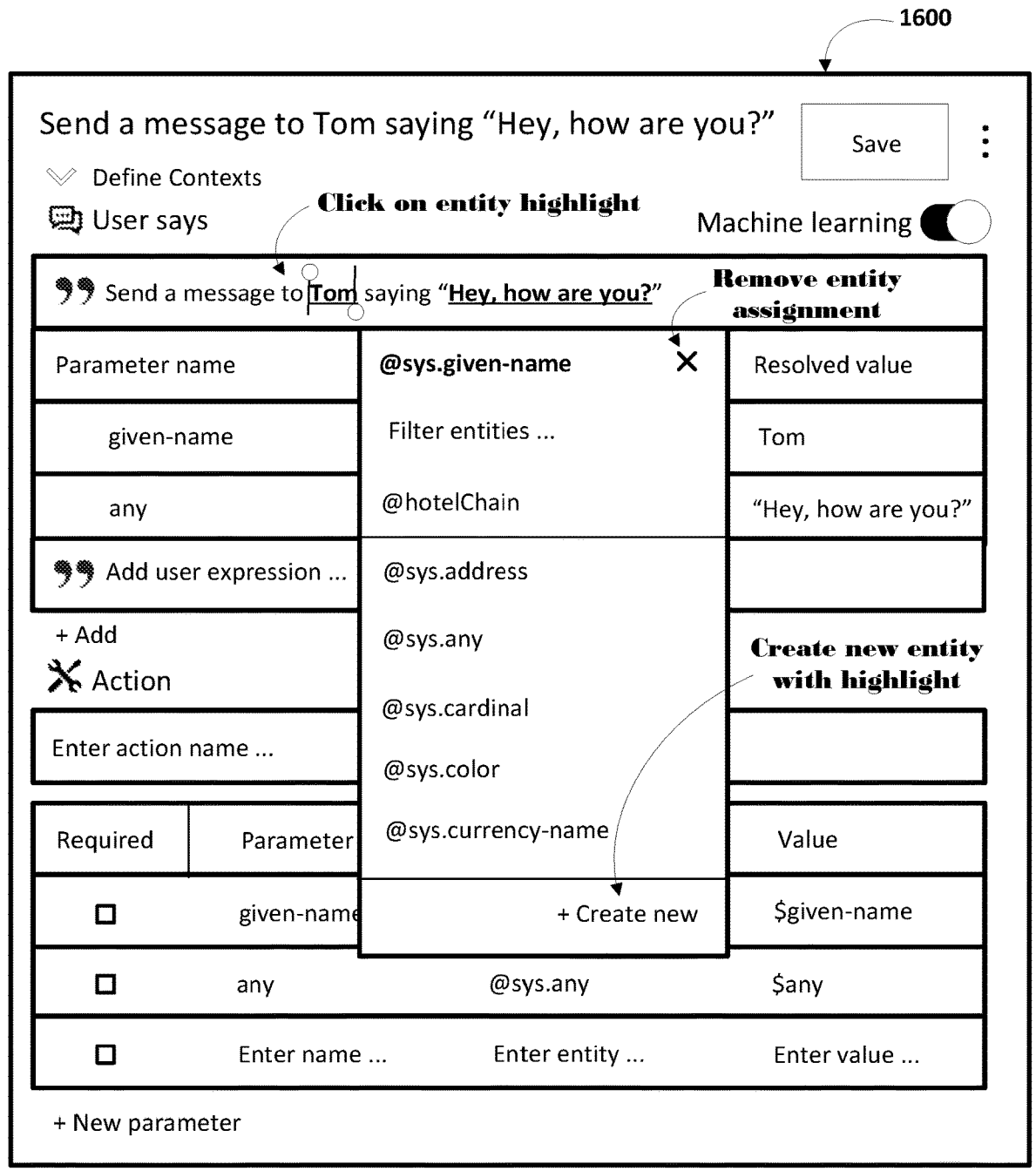

As illustrated in FIGS. 14 and 15, developer interface 112 allows a developer to mouse over an entity to highlight and change entity boundaries. A developer may highlight an incorrectly identified parameter and remove it. The developer may click on the highlighted entity and remove assignment, change entity type, or create a new entity for the highlighted entity.

In some embodiments, if a developer highlights a part of an example and assigns the part to an entity, this information can be used for training of machine learning. For example, "@color" entity includes "green", "red", and "blue". The developer can add an example such as "I like maroon". "Maroon" is not identified as @color since it is not in the entity definition. The developer can then highlight the "maroon" and identify it as belonging to "@color" entity. The dialog system engine can use this information to train a global natural language understanding model or a developer-specific natural language understanding model.

Thus, methods and systems for maintaining and enhancing knowledge databases associated with dialog system engines have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense. There are many alternative ways of implementing the present technology. The disclosed examples are illustrative and not restrictive.

What is claimed is:

1. A method implemented by a server, comprising:
   receiving, from a developer via a developer interface, and during creation of a given dialog system rule of a dialog system engine, at least a portion of the given dialog system rule,
       wherein the given dialog system rule is one of a plurality of dialog system rules that indicate instructions for response of the dialog system engine to future user requests;
   receiving, from the developer via the developer interface, multiple exemplary phrases defining an intent for the given dialog system rule,
       wherein each exemplary phrase, of the multiple exemplary phrases defining the intent for the given dialog system rule, include at least one or more entities;
   in response to receiving a given exemplary phrase of the multiple exemplary phrases defining the intent for the given dialog system rule:
       causing the given exemplary phrase to be provided for review by the developer via the developer interface, including:
           causing the given exemplary phrase to be presented in the developer interface, and causing a given linguistic element, that is present in the given exemplary phrase and that is a subset of the given exemplary phrase, to be presented along with a remainder of the given exemplary phrase and with an indication that the given linguistic element is assigned to a first entity type and to be presented with an indication of a plurality of alternative entity types;

receiving, in response to causing the given linguistic element to be presented with the indication that the given linguistic element is assigned to the first entity type and to be presented with the indication of alternative entity types, a selection of a second entity type, the second entity type being one of the alternative entity types; and in response to receiving the selection, causing the assignment of the given linguistic element to the first entity type to be changed to an alternative assignment of the given linguistic element to the second entity type;

associating, in one or more databases, the multiple exemplary phrases, the one or more entities, and the intent with the given dialog system rule to create the given dialog system rule, including associating the given linguistic element with the second entity type based on the alternative assignment; and subsequent to creation of the given dialog system rule:
receiving, from the developer via the developer interface, a test phrase to test the given dialog system rule;
processing, using the given dialog system rule, the test phrase to identify a particular intent and one or more particular entities associated with the test phrase;
causing the particular intent and the one or more particular entities associated with the test phrase to be provided for review by the developer via the developer interface;
receiving, from the developer via the developer interface, a modification to the intent for the given dialog system rule, wherein the modification to the intent is received responsive to the particular intent and the one or more particular entities associated with the test phrase being provided for review by the developer; and
modifying, in one or more of the databases, and based on the received modification to the intent, the given dialog system rule.

2. The method of claim 1, further comprising:
causing, based on the portion of the given dialog system rule, a prompt that requests the developer to provide the multiple exemplary phrases defining the intent for the given dialog system rule to be provided for presentation to the developer via the developer interface,
wherein receiving the multiple exemplary phrases defining the intent for the given dialog system rule is in response to the prompt being provided for presentation to the developer via the developer interface.

3. The method of claim 1, further comprising:
receiving, from the developer via the developer interface, a developer request to create the given dialog system rule; and
based on the developer request, enabling the developer to create the given dialog system rule via the developer interface.

4. The method of claim 1, wherein modifying the given dialog system rule comprises:

modifying, in one or more of the databases, the one or more entities that are associated with the multiple exemplary phrases and the intent to include one or more of the particular entities identified based on processing the test phrase.

5. The method of claim 1, wherein modifying the given dialog system rule comprises:
modifying, in one or more of the databases, the multiple exemplary phrases that are associated with the one or more entities and the intent to include the test phrase received from the developer.

6. The method of claim 1, further comprising:
subsequent to creation of the given dialog system rule:
receiving, from a client device of a user and via a dialog system interface associated with the dialog system engine, a user request;
determining, based on processing the user request, that the user request indicates the intent or the one or more entities associated with the given dialog system rule;
selecting, based on determining the user request indicates the intent or the one or more entities associated with the given dialog system rule, the given dialog rule for processing the user request; and
causing, based on processing the user request with the given dialog system rule, instructions that cause the client device to perform an action associated with the given dialog system rule to be transmitted to the client device.

7. The method of claim 1, wherein the indication that the given linguistic element is assigned to the first entity type is presented in a drop-down menu and the indication of alternative entity types is presented in the drop-down menu.

8. The method of claim 7, wherein the indication that the given linguistic element is assigned to the first entity type is presented positionally above the indication of alternative entity types.

9. A server, comprising:
at least one processor; and
memory storing instructions that, when executed, cause the at least one processor to perform operations, the operations comprising:
receiving, from a developer via a developer interface, and during creation of a given dialog system rule of a dialog system engine, at least a portion of the given dialog system rule,
wherein the given dialog system rule is one of a plurality of dialog system rules that indicate instructions for response of the dialog system engine to future user requests;
receiving, from the developer via the developer interface, multiple exemplary phrases defining an intent for the given dialog system rule,
wherein each exemplary phrase, of the multiple exemplary phrases defining the intent for the given dialog system rule, include at least one or more entities;
in response to receiving a given exemplary phrase of the multiple exemplary phrases defining the intent for the given dialog system rule:
causing the given exemplary phrase to be provided for review by the developer via the developer interface, including:
causing the given exemplary phrase to be presented in the developer interface, and
causing a given linguistic element, that is present in the given exemplary phrase and that is a subset of the given exemplary phrase, to be presented along with a remainder of the given exemplary phrase and with an indication that the given linguistic element is assigned to a first entity type and to be presented with an indication of a plurality of alternative entity types;

receiving, in response to causing the given linguistic element to be presented with the indication that the given linguistic element is assigned to the first entity type and to be presented with the indication of alternative entity types, a selection of a second entity type, the second entity type being one of the alternative entity types; and in response to receiving the selection, causing the assignment of the given linguistic element to the first entity type to be changed to an alternative assignment of the given linguistic element to the second entity type;

associating, in one or more databases, the multiple exemplary phrases, the one or more entities, and the intent with the given dialog system rule to create the given dialog system rule, including associating the given linguistic element with the second entity type based on the alternative assignment; and subsequent to creation of the given dialog system rule:
receiving, from the developer via the developer interface, a test phrase to test the given dialog system rule;
processing, using the given dialog system rule, the test phrase to identify a particular intent and one or more particular entities associated with the test phrase;
causing the particular intent and the one or more particular entities associated with the test phrase to be provided for review by the developer via the developer interface;
receiving, from the developer via the developer interface, a modification to the intent for the given dialog system rule, wherein the modification to the intent is received responsive to the particular intent and the one or more particular entities associated with the test phrase being provided for review by the developer; and
modifying, in one or more of the databases, and based on the received modification to the intent, the given dialog system rule.

10. The server of claim 9, the operations further comprising:
causing, based on the portion of the given dialog system rule, a prompt that requests the developer to provide the multiple exemplary phrases defining the intent for the given dialog system rule to be provided for presentation to the developer via the developer interface,
wherein receiving the multiple exemplary phrases defining the intent for the given dialog system rule is in response to the prompt being provided for presentation to the developer via the developer interface.

11. The server of claim 9, the operations further comprising:
receiving, from the developer via the developer interface, a developer request to create the given dialog system rule; and
based on the developer request, enabling the developer to create the given dialog system rule via the developer interface.

12. The server of claim 9, wherein modifying the given dialog system rule comprises:
modifying, in one or more of the databases, the one or more entities that are associated with the multiple exemplary phrases and the intent to include one or more of the particular entities identified based on processing the test phrase.

13. The server of claim 9, wherein modifying the given dialog system rule comprises:
modifying, in one or more of the databases, the multiple exemplary phrases that are associated with the one or more entities and the intent to include the test phrase received from the developer.

14. The server of claim 9, the operations further comprising:
subsequent to creation of the given dialog system rule:
receiving, from a client device of a user and via a dialog system interface associated with the dialog system engine, a user request;
determining, based on processing the user request, that the user request indicates the intent or the one or more entities associated with the given dialog system rule;
selecting, based on determining the user request indicates the intent or the one or more entities associated with the given dialog system rule, the given dialog rule for processing the user request; and
causing, based on processing the user request with the given dialog system rule, instructions that cause the client device to perform an action associated with the given dialog system rule to be transmitted to the client device.

15. A non-transitory computer-readable storage medium storing instructions that, when executed, cause at least one processor to perform operations, the operations comprising:
receiving, from a developer via a developer interface, and during creation of a given dialog system rule of a dialog system engine, at least a portion of the given dialog system rule,
wherein the given dialog system rule is one of a plurality of dialog system rules that indicate instructions for response of the dialog system engine to future user requests;
receiving, from the developer via the developer interface, multiple exemplary phrases defining an intent for the given dialog system rule,
wherein each exemplary phrase, of the multiple exemplary phrases defining the intent for the given dialog system rule, include at least one or more entities;
in response to receiving a given exemplary phrase of the multiple exemplary phrases defining the intent for the given dialog system rule:
causing the given exemplary phrase to be provided for review by the developer via the developer interface, including:
causing the given exemplary phrase to be presented in the developer interface, and
causing a given linguistic element, that is present in the given exemplary phrase and that is a subset of the given exemplary phrase, to be presented along with a remainder of the given exemplary phrase and with an indication that the given linguistic element is assigned to a first entity type and to be presented with an indication of a plurality of alternative entity types;
receiving, in response to causing the given linguistic element to be presented with the indication that the given linguistic element is assigned to the first entity type and to be presented with the indication of alternative entity types, a selection of a second entity type, the second entity type being one of the alternative entity types; and in response to receiving the selection, causing the assignment of the given linguistic element to the first entity type to be changed to an alternative assignment of the given linguistic element to the second entity type;

associating, in one or more databases, the multiple exemplary phrases, the one or more entities, and the intent with the given dialog system rule to create the given dialog system rule, including associating the given linguistic element with the second entity type based on the alternative assignment; and subsequent to creation of the given dialog system rule:
receiving, from the developer via the developer interface, a test phrase to test the given dialog system rule;

processing, using the given dialog system rule, the test phrase to identify a particular intent and one or more particular entities associated with the test phrase;

causing the particular intent and the one or more particular entities associated with the test phrase to be provided for review by the developer via the developer interface;

receiving, from the developer via the developer interface, a modification to the intent for the given dialog system rule, wherein the modification to the intent is received responsive to the particular intent and the one or more particular entities associated with the test phrase being provided for review by the developer; and modifying, in one or more of the databases, and based on the received modification to the intent, the given dialog system rule.

16. The non-transitory computer-readable storage-medium of claim 15, the operations further comprising:

causing, based on the portion of the given dialog system rule, a prompt that requests the developer to provide the multiple exemplary phrases defining the intent for the given dialog system rule to be provided for presentation to the developer via the developer interface, wherein receiving the multiple exemplary phrases defining the intent for the given dialog system rule is in response to the prompt being provided for presentation to the developer via the developer interface.

* * * * *